United States Patent
Takahashi et al.

(10) Patent No.: US 12,046,975 B2
(45) Date of Patent: Jul. 23, 2024

(54) VIBRATION ACTUATOR AND ELECTRONIC APPARATUS

(71) Applicants: Yuki Takahashi, Tokyo (JP); Masaharu Kagami, Tokyo (JP); Tomoya Ishitani, Tokyo (JP); Takanori Kato, Tokyo (JP); Yoshihiro Gomi, Tokyo (JP)

(72) Inventors: Yuki Takahashi, Tokyo (JP); Masaharu Kagami, Tokyo (JP); Tomoya Ishitani, Tokyo (JP); Takanori Kato, Tokyo (JP); Yoshihiro Gomi, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 780 days.

(21) Appl. No.: 17/259,206

(22) PCT Filed: Jul. 9, 2019

(86) PCT No.: PCT/JP2019/027082
§ 371 (c)(1),
(2) Date: Jan. 11, 2021

(87) PCT Pub. No.: WO2020/013161
PCT Pub. Date: Jan. 16, 2020

(65) Prior Publication Data
US 2021/0273543 A1    Sep. 2, 2021

(30) Foreign Application Priority Data

Jul. 11, 2018  (JP) .................................. 2018-131821

(51) Int. Cl.
*H02K 33/18*    (2006.01)
*B06B 1/04*    (2006.01)

(52) U.S. Cl.
CPC ............. *H02K 33/18* (2013.01); *B06B 1/045* (2013.01)

(58) Field of Classification Search
CPC ....... H02K 33/18; B06B 1/045; H01L 31/186; H02S 40/38; Y02E 10/544
See application file for complete search history.

(56) References Cited

U.S. PATENT DOCUMENTS

2006/0255665 A1* 11/2006 Kraus .................... H02K 33/18
310/36
2008/0150380 A1   6/2008 Hsiao et al.
(Continued)

FOREIGN PATENT DOCUMENTS

JP         59-037714         3/1984
JP         11-226500         8/1999
(Continued)

OTHER PUBLICATIONS

WO-2017051843-A1, IShii et al., all pages (Year: 2017).*
(Continued)

*Primary Examiner* — Naishadh N Desai

(57) ABSTRACT

This vibration actuator has a movable body having a coil, a fixed body having magnets, and a shaft part that rotatably supports the movable body, wherein the movable body reciprocally and rotationally vibrates around the shaft part with respect to the fixed body through the interaction of the coil and the magnets. The magnets are arranged in a direction perpendicular to the axial direction of the shaft part and each have two magnetic poles that face the movable body in the coil axial direction of the coil, the shaft part supports the movable body at a position shifted from the center position of the movable body in a direction perpendicular to the axial direction of the shaft part, and the coil axis of the coil of the (Continued)

movable body is located at a position facing a switching position of the magnetic pole of the magnet.

11 Claims, 15 Drawing Sheets

(56) References Cited

U.S. PATENT DOCUMENTS

| | | | |
|---|---|---|---|
| 2011/0101796 | A1 | 5/2011 | Odajima et al. |
| 2015/0137627 | A1 | 5/2015 | Katada et al. |
| 2018/0367019 | A1 | 12/2018 | Takahashi et al. |
| 2019/0386552 | A1* | 12/2019 | Takahashi ............. H04M 19/04 |
| 2020/0076287 | A1* | 3/2020 | Takahashi ............. H02K 33/06 |
| 2021/0273543 | A1 | 9/2021 | Takahashi et al. |

FOREIGN PATENT DOCUMENTS

| | | |
|---|---|---|
| JP | 2015-157277 | 3/2005 |
| JP | 4875133 | 12/2011 |
| JP | 2015-095943 | 5/2015 |
| JP | 2015-112013 | 6/2015 |
| JP | 2016-103881 | 6/2016 |
| JP | 2016-140127 | 8/2016 |
| KR | 10-2009-0115330 | 11/2009 |
| KR | 10-2015-0128264 | 11/2015 |
| WO | WO-2017051843 A1 * 3/2017 ............... B06B 1/04 |
| WO | WO 2017/185331 | 11/2017 |
| WO | WO 2020/013161 | 1/2020 |

OTHER PUBLICATIONS

Official Action Dated Feb. 14, 2023 From the US Patent and Trademark Office Re. U.S. Appl. No. 17/449,294. (24 Pages).
International Search Report and the Written Opinion Dated Sep. 24, 2019 From the International Searching Authority Re. Application No. PCT/JP2019/027082 and Its Translation of Search Report Into English. (10 Pages).
Supplementary European Search Report and the European Search Opinion Dated Mar. 14, 2022 From the European Patent Office Re. Application No. 19834558.9. (7 Pages).

* cited by examiner

VIBRATION ACTUATOR AND ELECTRONIC APPARATUS

TECHNICAL FIELD

The present invention relates to a vibration actuator and an electronic apparatus.

BACKGROUND ART

In the related art, a vibration actuator is mounted on an electronic apparatus, as a vibration generation source for notifying an incoming call or for improving a feeling of operation on a touch screen or realism of an amusement device such as a controller of a game apparatus by transmitting vibration to a finger, a thumb, a limb, or the like. Note that, examples of the electronic apparatus include a portable communication terminal such as a mobile phone or a smartphone, a portable information terminal such as a tablet PC, a portable game terminal, a controller (gamepad) of a stationary game machine, and a wearable terminal attached to clothes, an arm, or the like.

Vibration actuators disclosed in Patent Literatures (hereinafter, each referred to as "PTL") 1 to 3 include a fixed body including a coil, and a movable body including a magnet, and generate vibration by causing the movable body to reciprocate by utilizing a driving force of a voice coil motor composed of the coil and the magnet. The vibration actuators indicated in PTLs 1 to 3 are linear actuators in which the movable body moves in a straight line along a shaft, and are mounted such that the vibration direction is parallel to the main surface of an electronic apparatus. Vibration in a direction along a body surface of a user which comes in contact with the electronic apparatus is transmitted to the body surface.

Further, as a vibration actuator, a configuration in which a movable body movably supported by a coil spring and including a magnet is reciprocatingly and rotationally driven together with a rotary shaft or around the rotary shaft with respect to a fixed body including a coil is known as in a vibration motor disclosed in PTL 4.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133
PTL 4
Japanese Patent Application Laid-Open No. 2016-103881
PTL 5
Japanese Patent Application Laid-Open No. 2015-157277

SUMMARY OF INVENTION

Technical Problem

An electronic apparatus having a vibration function is required to be capable of giving sufficient physically-felt vibration to a user. However, electronic apparatuses equipped with the vibration actuators disclosed in PTLs 1 to 3 are configured to transmit vibration in a direction along a body surface of a user which comes in contact with the electronic apparatus to the body surface, and therefore may not give sufficient physically-felt vibration. In addition, a structure configured to generate vibration by rotationally driving a movable body as in PTLs 4 and 5 requires another component, such as a weight, for shifting the center of gravity of the movable body. Further, there is a problem that the degree of freedom in design is limited and a reduction in size becomes difficult since the component cost increases and space for disposing the other component needs to be ensured.

An object of the present invention is to provide a vibration actuator and an electronic apparatus which are small and capable of giving sufficient physically-felt vibration to a user without an increase in size.

Solution to Problem

A vibration actuator according to an aspect of the present invention includes:
- a movable body including a coil;
- a fixed body including one or more magnets; and
- a shaft part rotatably supporting the movable body, the movable body reciprocatingly and rotationally vibrating around the shaft part with respect to the fixed body by cooperation between the coil and the one or more magnets, the vibration actuator having a configuration in which:
- the one or more magnets are arranged in a direction orthogonal to an axial direction of the shaft part, each of the one or more magnets including two magnetic poles facing the movable body in a direction of a coil axis of the coil,
- the shaft part supports the movable body at a position shifted from a center position of the movable body in the direction orthogonal to the axial direction of the shaft part, and
- the coil axis of the coil of the movable body is located at a position facing a switching position of the two magnetic poles of each of the one or more magnets.

An electronic apparatus according to an aspect of the present invention has a configuration in which the aforementioned vibration actuator is mounted thereon.

Advantageous Effects of Invention

According to the present invention, it is possible to provide a vibration actuator and an electronic apparatus which are small and capable of giving sufficient physically-felt vibration to a user without an increase in size.

DESCRIPTION OF EMBODIMENTS

Hereinafter, embodiments of the present invention will be described in detail with reference to the accompanying drawings.

Embodiment 1

[Overall Configuration of Vibration Actuator 1]

Figure 1:
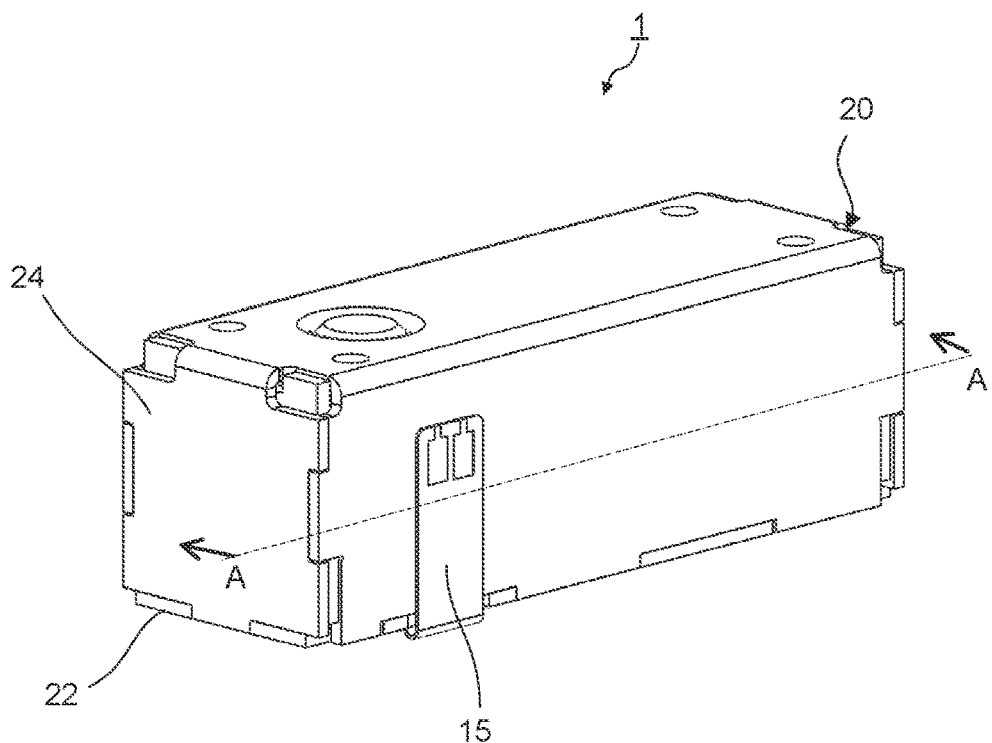
FIG. 1 is a perspective view of an external appearance of a vibration actuator according to Embodiment 1 of the present invention.
Figure 2:
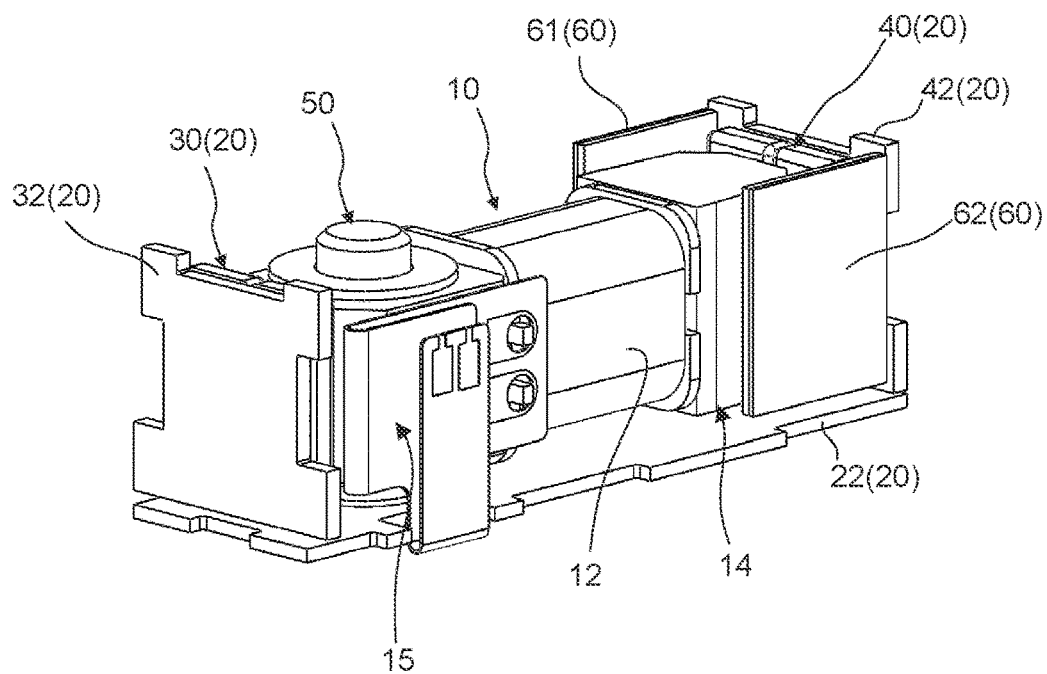
FIG. 2 is a perspective view of the vibration actuator in a state in which a cover of the vibration actuator is removed.
Figure 3:
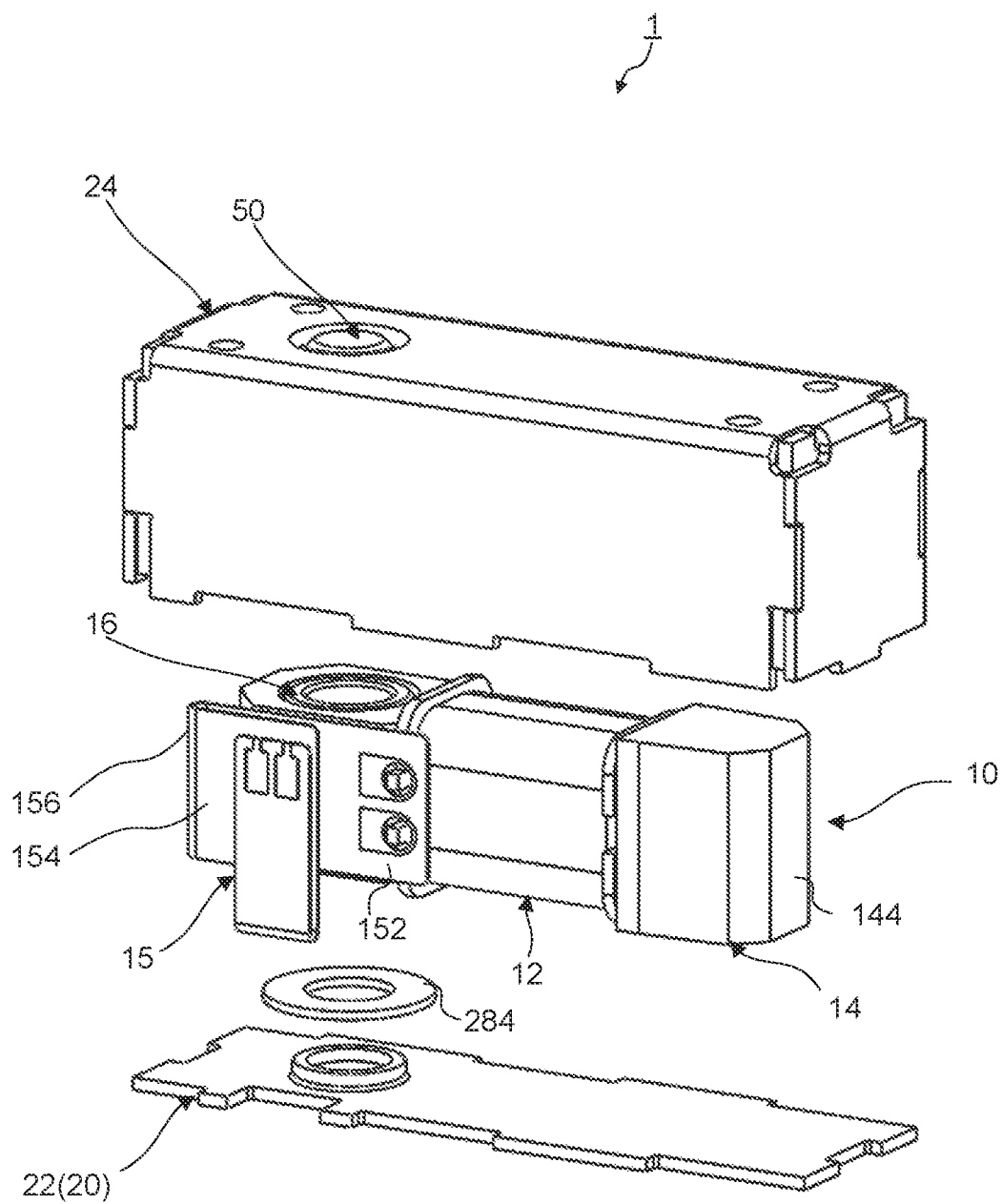
FIG. 3 is an exploded perspective view of the vibration actuator in which a movable body is illustrated.
Figure 4:
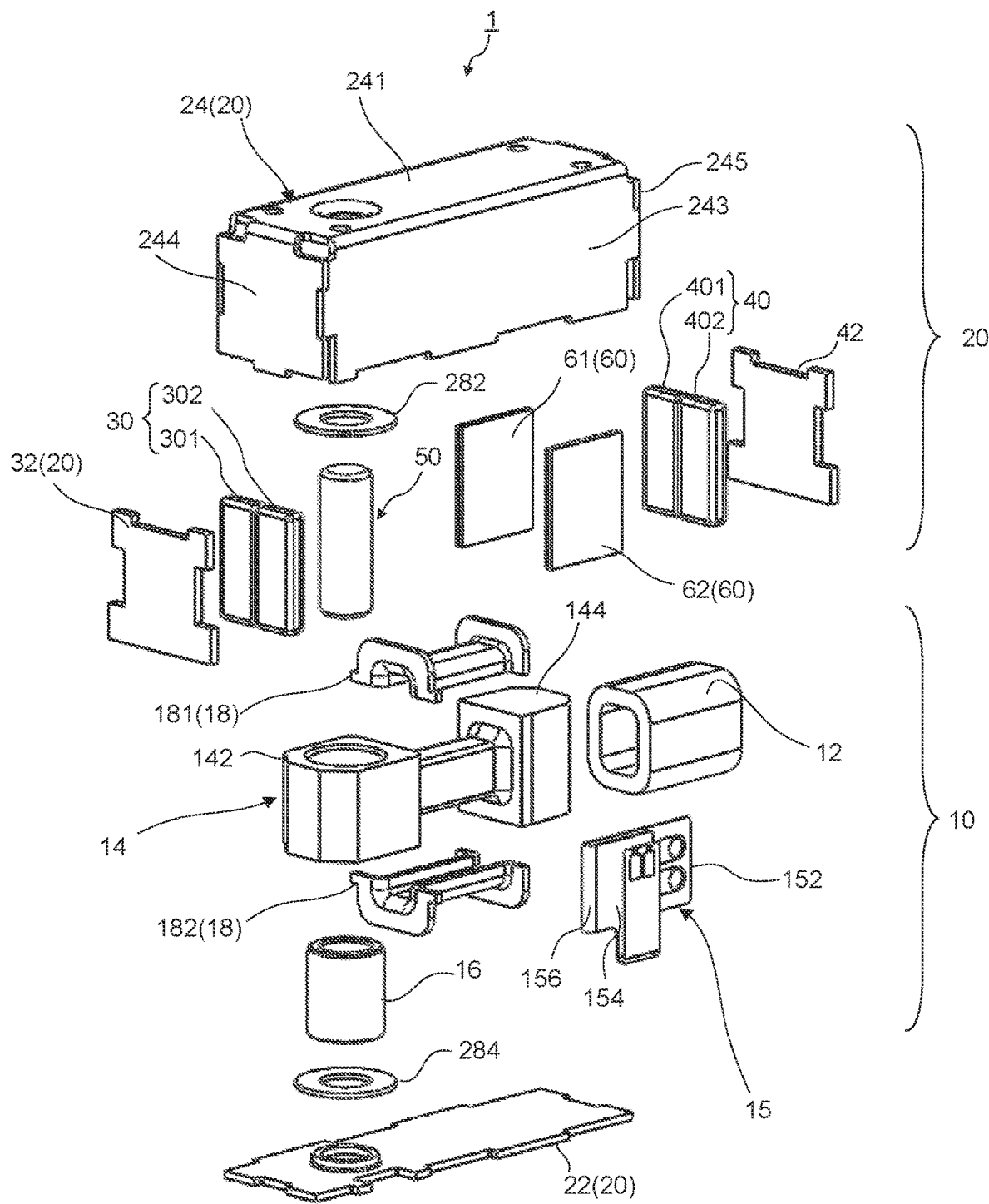
FIG. 4 is an exploded perspective view of the vibration actuator.

FIG. 1 is a perspective view of an external appearance of a vibration actuator according to Embodiment 1 of the present invention. FIG. 2 is a perspective view of the vibration actuator in a state in which a cover of the vibration actuator is removed. FIG. 3 is an exploded perspective view of the vibration actuator in which a movable body is illustrated.

In the present embodiment, an orthogonal coordinate system (X, Y, Z) will be used for explanation. The drawings described later (including the drawings used for describing Variation 1 of Embodiment 1 and Embodiment 2 as well) are also illustrated with the common orthogonal coordinate system (X, Y, Z). Hereinafter, the width, depth, and height of vibration actuator 1 are lengths in X, Y, and Z directions, respectively. For convenience, the vibration actuator of the present embodiment is illustrated in a state in which the Z direction is disposed toward a lateral direction in FIGS. 1 to 4, and will be described with the Z direction as a vibration direction. Further, a "side of the movable body" in the present embodiment means a radiation direction orthogonal to the Z direction around the movable body, and means the X direction, the −X direction, and the Y direction around the movable body in the present embodiment. In addition, a plus side in the Z direction may be set as an upper side, and a minus side in the Z direction may be set as a lower side.

Vibration actuator 1 is mounted as a vibration generation source on an electronic apparatus such as a game apparatus (game controller GC), smartphone SP and wearable terminal W (see FIGS. 14 to 16), and realizes a vibration function of the electronic apparatus. Vibration actuator 1 is driven to vibrate, for example, in the case of giving a feeling of operation or realism to a user or notifying a user of an incoming call. For example, vibration actuator 1 is mounted such that a vibration transmitting surface of an electronic apparatus which comes in contact with a user is parallel to the XY plane. In an electronic apparatus, for example, the vibration transmitting surface is a surface with which a body surface, such as a finger, a thumb or the like, of a user comes in contact (a surface on which an operation button or the like is disposed, or a rear surface on which another finger or the like abuts) in the case of a game controller, and the vibration transmitting surface is a touch screen surface in the case of a smartphone or a tablet terminal. Further, in a wearable terminal attached to a user's clothes, arm or the like, the vibration transmitting surface is an outer surface that comes in contact with the clothing or arm (inner peripheral surface 208 indicated in FIG. 16).

As illustrated in FIGS. 1 to 4, vibration actuator 1 includes movable body 10, shaft part 50, and fixed body 20. Movable body 10 is supported by fixed body 20 via shaft part 50. In the present embodiment, movable body 10 is rotatably supported by fixed body 20 such that a side of another end of movable body 10 reciprocates while shaft part 50 inserted through movable body 10 on a side of one end thereof serves as a fulcrum.

Movable body 10 is a part that vibrates (oscillates) during driving. In the present embodiment, movable body 10 includes coil 12, and core 14 around which coil 12 is wound. Fixed body 20 includes one or more magnets (first magnet 30 and second magnet 40).

Movable body 10 is movably supported with respect to fixed body 20 by magnetic springs by means of magnetic attraction forces of the one or more magnets (first magnet 30 and second magnet 40). In the present embodiment, movable body 10 is movably supported around shaft part 50 with respect to fixed body 20 by magnetic springs formed by the one or more magnets (first magnet 30 and second magnet 40), coil 12, and core 14.

[Shaft Part 50]

Figure 5:
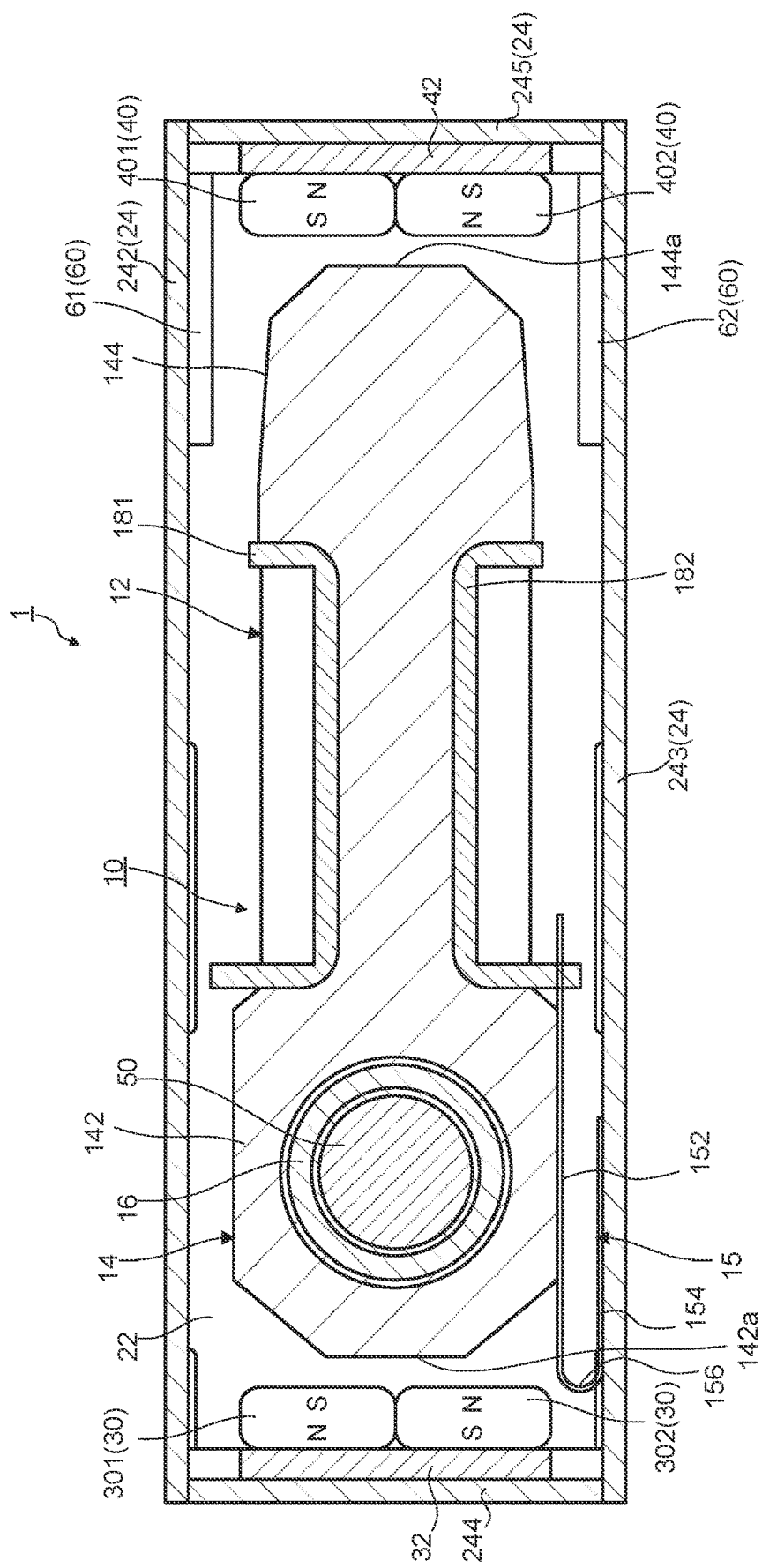
FIG. 5 is a plane sectional view of a configuration of principal parts of the vibration actuator.

FIG. 5 is a plane sectional view of a configuration of principal parts of the vibration actuator.

Shaft part 50 supports movable body 10 to be capable of reciprocatingly and rotationally vibrating with respect to fixed body 20.

Shaft part 50 may be either a non-magnetic body or a magnetic body. In the present embodiment, shaft part 50 is composed of a magnetic body such as SUS420J2, for example.

Shaft part 50 is disposed between base plate 22 and bottom surface part 241 of case 24 fixed to base plate 22. Washer 282 that is externally applied on shaft part 50 is interposed between bottom surface part 241 of case 24 and movable body 10, and washer 284 that is externally applied on shaft part 50 is interposed between base plate 22 and movable body 10. By washers 282 and 284 described above, shaft part 50 supports movable body 10 to smoothly reciprocatingly rotate with respect to fixed body 20.

[Movable Body 10]

Movable body 10 includes coil 12, core 14 around which coil 12 is wound, bushing (bearing) 16 that is a bearing, and coil bobbin 18 (divided bobbin bodies 181 and 182).

Core 14 is formed by a long magnetic body extending in a direction of a coil axis of coil 12. Core 14 is disposed between base plate 22 and bottom surface part 241 of case 24 with predetermined intervals from each of base plate 22 and bottom surface part 241. Here, the predetermined intervals refer to a space composing the movement range of movable body 10.

Core 14 is preferably a magnetic body that is magnetized by energizing coil 12. Core 14 may be a ferrite core. Further, core 14 may be composed of an electromagnetic stainless steel, a sintered material, an MIM (metal injection molding) material, a laminated steel plate, an electrogalvanized steel plate (SECC: steel electrolytic cold commercial), or the like.

Core 14 is provided to extend in a direction orthogonal to an axial direction of shaft part 50. Core 14 is rotatably provided via shaft part 50 inserted through core 14 on a side of one end thereof, and another end part of core 14 vibrates as a free end part in a direction orthogonal to fixed body 20 (specifically, base plate 22 and bottom surface part 241 of case 24), here in the Z direction.

Core 14 includes one end part 142 in which a through-hole is formed. Bushing 16 through which shaft part 50 is inserted is fitted into the through-hole.

Coil bobbin 18 (divided bobbin bodies 181 and 182) is externally applied between the one end part and the other end part of core 14, and coil 12 is wound around coil bobbin 18. In the present embodiment, movable body 10 is formed in a rectangular parallelepiped shape by winding coil 12 around core 14 via coil bobbin 18.

By energizing and exciting coil 12, a center of a length of a thickness direction, that is, the vibration direction (the Z direction), of end surfaces 142*a* and 144*a* of the both end parts, that is, one end part 142 and another end part 144, of core 14 becomes a center of the magnetic poles. End surfaces 142*a* and 144*a* are located in an axial direction of the coil.

In movable body 10, the center of the magnetic poles of movable body 10 is disposed on the coil axis of coil 12.

Bushing 16 has a tubular shape. Shaft part 50 is inserted through bushing 16, and bushing 16 causes movable body 10 to be rotatable (movable) around shaft part 50. Bushing 16 may be formed by any material such as a metal, such as a sintered metal, and a resin. In the case where shaft part 50 is a magnetic body, however, bushing 16 is preferably formed by a non-magnetic material. Further, when shaft part 50 is a non-magnetic body, bushing 16 may be formed by a magnetic body.

When one of shaft part 50 and bushing 16 is a non-magnetic body, a magnetic flux passing through core 14 does not pass between shaft part 50 and bushing 16, and no increase in friction due to the generation of magnetic attraction forces occurs between both. That is, no friction due to magnetic attraction forces is generated between bushing 16 and shaft part 50 inserted through bushing 16, and it is possible to perform the rotation of movable body 10 smoothly.

For example, vibration actuator 1 is formed by using a magnetic shaft having durability (for example, SUS420J2) as shaft part 50 and a copper-based sintered bearing as bushing 16. This configuration makes it possible to suppress a magnetic attraction force unnecessary for driving of movable body 10 and to hold movable body 10 with low friction. That is, it is possible to suppress wear due to driving of movable body 10 and to realize vibration actuator 1 with a high reliability.

One end part 152 of flexible substrate 15 is fixed to one end part 142 of core 14. Both end parts of coil 12 are connected to a circuit of flexible substrate 15.

Flexible substrate 15 supplies power to coil 12. In the present embodiment, flexible substrate 15 is disposed so as to connect movable body 10 and fixed body 20.

Flexible substrate 15 includes one end part 152, another end part 154, and at least one curved part 156 between one end part 152 and another end part 154. One end part 152 is connected to coil 12 of movable body 10. Another end part 154 is fixed on a side of fixed body 20. Curved part 156 has flexibility and is electrically connected to coil 12 from a side of one end of flexible substrate 15.

Curved part 156 is interposed between one end part 152 and another end part 154, and has flexibility to be deformed following the vibration of movable body 10. Curved part 156 bends in the direction orthogonal to the axial direction of shaft part 50.

Coil 12 is a coil that is energized to move movable body 10, and is energized to magnetize one end part 142 and another end part 144 of core 14. Coil 12 changes the polarities of the both end parts (one end part 142 and another end part 144) of core 14 by switching the energization direction.

Coil bobbin 18 is composed of divided bobbin bodies 181 and 182. Each of divided bobbin bodies 181 and 182 is fixed by being externally applied so as to circumferentially surround a portion between one end part 142 and another end part 144 of core 14. For example, divided bobbin bodies 181 and 182 may be composed of a resin material such as a polyamide resin, a liquid crystal polymer, and a polyphenylene sulfide resin (PPS resin).

[Fixed Body 20]

Fixed body 20 rotatably supports movable body 10 via shaft part 50.

Fixed body 20 includes, in addition to the one or more magnets (first magnet 30 and second magnet 40), base plate 22 and case 24. Fixed body 20 further includes a cushion material (buffer part 60).

Base plate 22 is formed by a plate-like material such as a steel plate (a rectangular plate in the present embodiment). In the present embodiment, base plate 22 composes one side surface of vibration actuator 1. Note that, base plate 22 is attached such that case 24 covers base plate 22, and base plate 22 and case 24 compose a housing that movably houses movable body 10. In the present embodiment, the housing is formed to be hollow and to have a rectangular parallelepiped shape. On a side of one end of the housing in the longitudinal direction, shaft part 50 is fixed along a direction orthogonal to the vibration direction of movable body 10. Bottom surface part 241 of case 24 composes another side surface facing the one side surface of vibration actuator 1.

On base plate 22, shaft part 50 is erected via shaft fixing part 23 on a side of one end of base plate 22, and movable body 10 is disposed away from and facing base plate 22. Further, in one end part of base plate 22, first magnet 30 is disposed facing a side of one end of movable body 10, and in another end part of base plate 22, second magnet 40 is disposed facing the side of the other end of movable body 10.

Case 24 is fixed to base plate 22 so as to cover movable body 10 facing base plate 22.

Another end of shaft part 50 is fixed to bottom surface part 241 of case 24, which faces base plate 22 in the width direction (the X direction), via the shaft fixing part (not illustrated).

Case 24 is formed in a box shape (a rectangular box shape in the present embodiment) that opens on a side of base plate 22. Case 24 includes bottom surface part 241, both of side surface parts 242 and 243, one end surface part 244 and another end surface part 245. Shaft part 50 is disposed between bottom surface part 241 and base plate 22. Side surface parts 242 and 243 are disposed away from and facing each other in the vibration direction (here, the height direction (the Z direction)) of movable body 10. One end surface part 244 and another end surface part 245 are disposed away from and facing each other in an extending direction (here, the depth direction (the Y direction)) of movable body 10.

The dimensions of the housing formed by attaching case 24 to base plate 22 are not particularly limited. In the present embodiment, however, the housing is configured so as to have a rectangular parallelepiped shape in which, among the width (the X direction), the depth (the Y direction), and the height (the Z direction), the depth is the longest and the height is the shortest.

Case 24 and base plate 22 may be formed by a material having conductivity, for example, a plate-like material such as a steel plate (a rectangular plate in the present embodiment). Thus, base plate 22 and case 24 are capable of functioning as electromagnetic shields.

Further, on a side of another end of case 24, buffer part 60 (cushion materials 61 and 62) with which a side of a free end of movable body 10 that vibrates comes in contact is provided in both of side surface parts 242 and 243 of case 24, respectively.

Figure 7A:
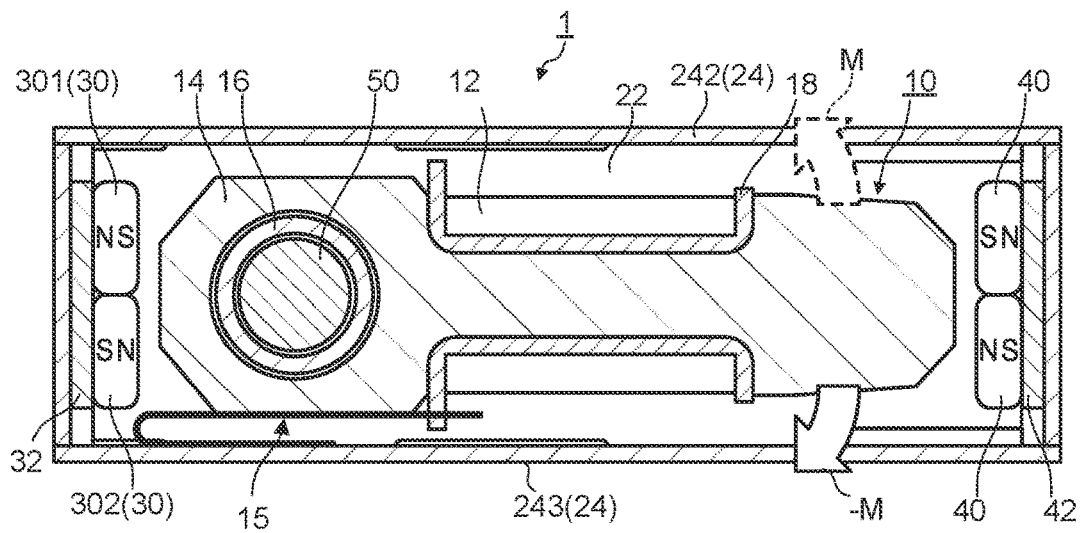
FIG. 7A is a longitudinal sectional view of the movable body when energization is not performed.
Figure 7B:
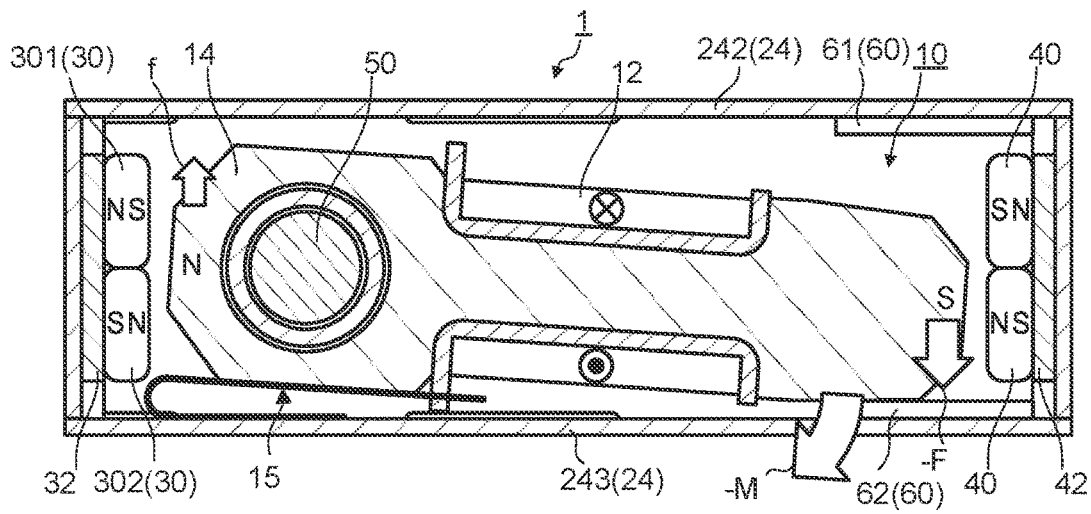
FIG. 7B is a longitudinal sectional view of the movable body when a coil is energized clockwise when viewing the vibration actuator from a side of a tip part of the movable body.
Figure 7C:
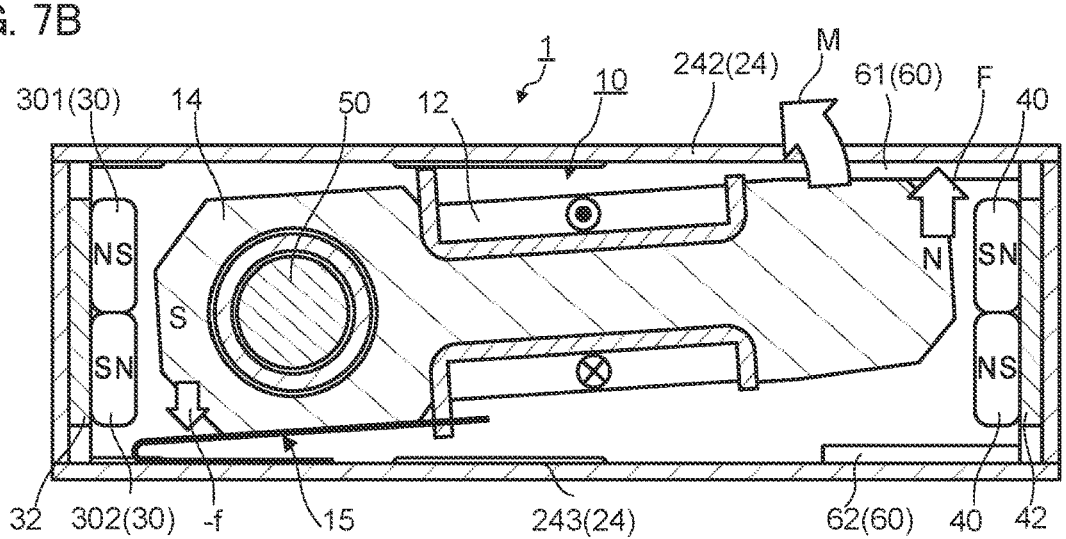
FIG. 7C is a longitudinal sectional view of the movable body when the coil is energized counterclockwise when viewing the vibration actuator from the side of the tip part of the movable body.

When movable body 10 vibrates, another end part of movable body 10 comes in contact with buffer part 60, and thereby buffer part 60 transmits the vibration of movable body 10 to the housing of vibration actuator 1 (see FIGS. 7A to 7C). Thus, buffer part 60 makes it possible to generate a large vibration in the housing.

Buffer part 60 is formed by, for example, a soft material such as a rubber, such as an elastomer and a silicone rubber, a resin, or a porous elastic body (for example, a sponge). In the present embodiment, buffer part 60 is configured as cushion materials 61 and 62 provided in both of side surface parts 242 and 243 that are a side of the housing. Buffer part 60 may be provided on a side of movable body 10, for example, in another end part 144 that is a free end part of movable body 10, so that movable body 10 comes in contact with both of side surface parts 242 and 243 at buffer part 60 when movable body 10 vibrates. In a case where buffer part 60 is an elastomer, it is possible to reduce generation of a sound or a vibration noise created when another end part 144 of core 14 of movable body 10 comes in contact with side surface parts 242 and 243 during driving of movable body 10.

Further, in a case where buffer part 60 is a silicone rubber, generation of a sound or a vibration noise created when another end part 144 of core 14 of movable body 10 comes into contact with side surface parts 242 and 243 can be reduced. In addition, in a case where buffer part 60 is a silicone rubber, no individual difference occurs in the thickness of buffer part 60 in comparison with a case where buffer part 60 is an elastomer formed by a sponge-like material containing bubbles inside. Accordingly, it is possible to easily manage the thickness of buffer part 60 such that buffer part 60 has a desired thickness, and to ensure stability of characteristics as buffer part 60.

The one or more magnets (first magnet 30 and second magnet 40) move movable body 10 by cooperation with coil 12. The one or more magnets function as magnetic springs by means of magnetic attraction forces with respect to movable body 10. In the present embodiment, the one or more magnets and core 14 around which coil 12 is wound form the magnetic springs to movably support movable body 10.

The one or more magnets are arranged to face each other in an axial direction of coil 12 with respect to coil 12.

In the present embodiment, the one or more magnets include first magnet 30 away from and facing one end part of core 14 in the axial direction of coil 12, and second magnet 40 away from and facing another end part of core 14 in the axial direction of coil 12.

Each of first magnet 30 and second magnet 40 is magnetized toward core 14 (movable body 10). In the present embodiment, the magnetization directions of first magnet 30 and second magnet 40 are parallel to the axial direction of coil 12. Each of first magnet 30 and second magnet 40 includes, each as a surface on a side facing core 14, two different magnetic poles arranged in a direction (corresponding to the vibration direction of movable body 10) orthogonal to an extending direction of shaft part 50.

The magnetic poles are disposed such that a center of core 14 of movable body 10 (here, the center is on an axis of coil 12 and corresponds to a center of the magnetic poles when coil 12 is excited) is positioned facing a boundary between the magnetic poles, that is, a switching position of the magnetic poles.

The polarities of the magnetic poles of both of first magnet 30 and second magnet 40 are magnetized such that torque to be generated by exciting coil 12 of movable body 10 is generated in the same rotational direction as that of movable body 10.

For example, as illustrated in FIG. 5, magnetic poles 301 and 401 of first magnet 30 and second magnet 40, which are disposed on a side of side surface part 242 and face movable body 10, are each formed so as to be the same pole (the S pole in FIG. 5). Further, magnetic poles 302 and 402 of first magnet 30 and second magnet 40, which are disposed on a side of side surface part 243 and face movable body 10, are each formed so as to be the same pole (the N pole in FIG. 5).

First magnet 30 includes a rear surface on which back yoke 32 is bonded, and second magnet 40 includes a rear surface on which back yoke 42 is bonded, so that an improvement in an magnetic attraction force of reach of first magnet 30 and second magnet 40 is achieved.

In a case where magnetization is performed in first magnet 30 and second magnet 40 such that the S pole is on the side of side surface part 242 and the N pole is on the side of side surface part 243, a magnetic flux emitted from the N pole and incident on the S pole is formed at first magnet 30 and second magnet 40, respectively, when coil 12 is not energized as illustrated in FIG. 5. When energization is not performed, one end part 142 of core 14 around which coil 12 is wound is attracted to both the S and N poles of first magnet 30, and is held at a switching position of magnetic poles 301 and 302 that are different from each other (the S and N poles), and further another end part 144 of core 14 is attracted to both the S and N poles of second magnet 40, and is held at a switching position of magnetic poles 401 and 402 that are different from each other (the S and N poles). First magnet 30 and second magnet 40, together with core 14 that is a magnetic body of movable body 10, function as magnetic springs by means of magnetic attraction forces generated between first magnet 30 and second magnet 40 and core 14 to movably support movable body 10.

Another end part 154 of flexible substrate 15 that is connected to coil 12 with one end part 152 is fixed to side surface part 243.

One end part 152 of flexible substrate 15, which is connected to coil 12, is fixed to one end part of movable body 10. Another end part 154 of flexible substrate 15 is fixed to fixed body 20, here, to side surface part 243. Another end part 154 is, while being partially exposed to an outer surface of the housing, fixed to side surface part 243. When movable body 10 moves, the movement range near shaft part 50 is smaller than in a portion on the side of the other end of movable body 10. For this reason, a load applied to curved part 156 of flexible substrate 15 disposed near shaft part 50 is reduced. Thus, since flexible substrate 15 is fixed near shaft part 50, it is possible to minimize displacement of flexible substrate 15 and to prevent disconnection due to a stress generated during movement.

Note that, it may be configured such that, for example, an elastic member such as an elastic adhesive or an elastic adhesive tape is interposed between one end part 152 of flexible substrate 15 and movable body 10 and absorbs an impact created during vibration.

[Magnetic Circuit of Vibration Actuator 1]

Figure 6:
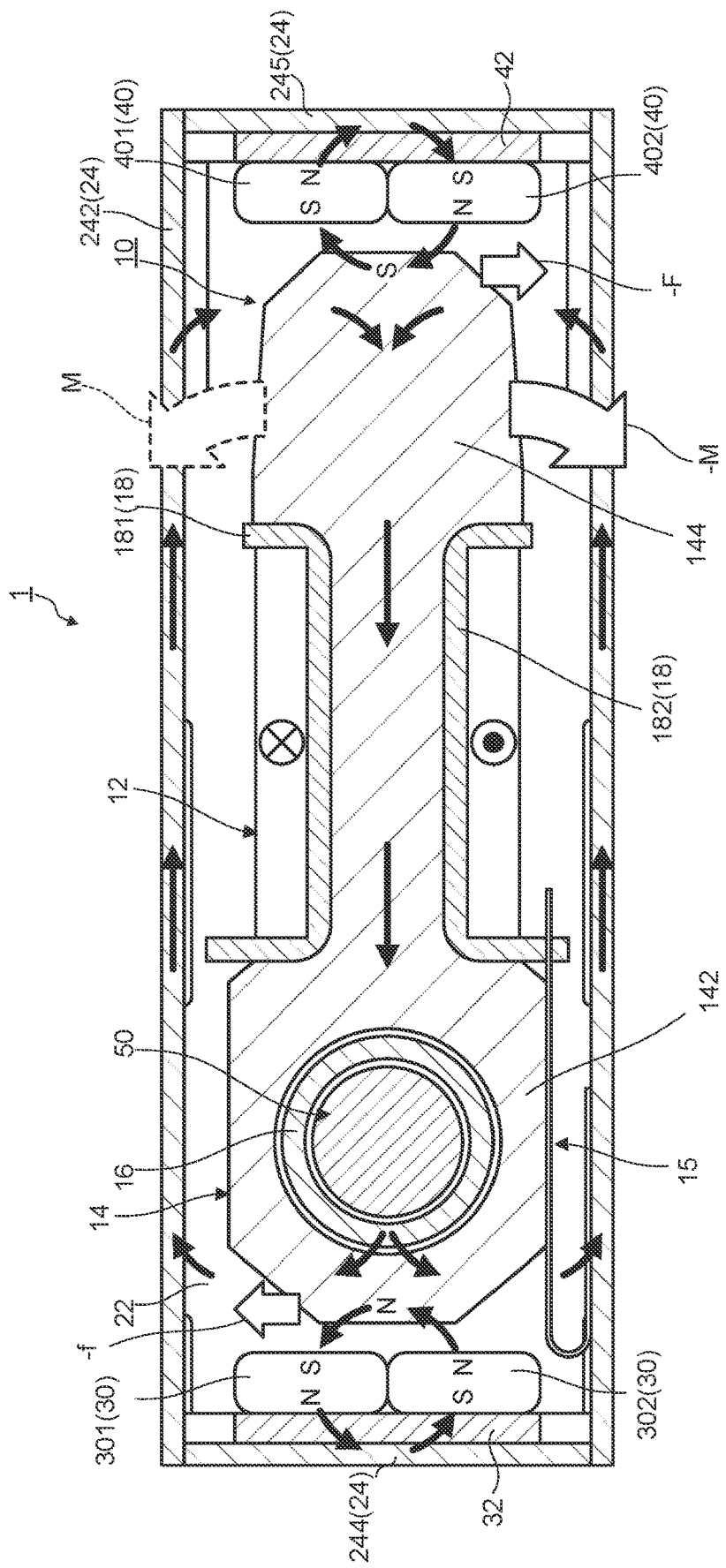
FIG. 6 illustrates a magnetic circuit of the vibration actuator.

FIG. 6 illustrates a magnetic circuit of the vibration actuator. FIGS. 7A to 7C are longitudinal sectional views illustrating operation of the movable body. FIG. 7A illustrates a state of movable body 10 when energization is not performed (reference state). FIG. 7B illustrates a state of movable body 10 when coil 12 is energized clockwise when viewing vibration actuator 1 from a side of a tip part of movable body 10, that is, a side of another end part 144 of core 14. FIG. 7C illustrates a state of movable body 10 when coil 12 is energized counterclockwise when viewing vibration actuator 1 from the side of the tip part of movable body 10, that is, the side of another end part 144 of core 14.

In vibration actuator 1, movable body 10 is disposed in a state where the side of the one end of movable body 10 is supported via shaft part 50 between base plate 22 of fixed body 20 and case 24. In addition, the one or more magnets (first magnet 30 and second magnet 40) are disposed to face the both end parts (one end part 142 and another end part 144) of core 14 around which coil 12 is wound, with the two different magnetic poles of each of the one or more magnets being directed toward a side of coil 12, in the axial direction of coil 12 of movable body 10. Magnetic pole 301 of first magnet 30 and magnetic pole 401 of second magnet 40 are the same pole, and magnetic pole 302 of first magnet 30 and magnetic pole 402 of second magnet 40 are the same pole.

In each magnet of first magnet 30 and second magnet 40, magnetic poles 301 and 302 that are two different magnetic poles are arranged side by side in the direction orthogonal to the axial direction of shaft part 50, and magnetic poles 401 and 402 that are two different magnetic poles are arranged side by side in the direction orthogonal to the axial direction of shaft part 50.

Figure 14:
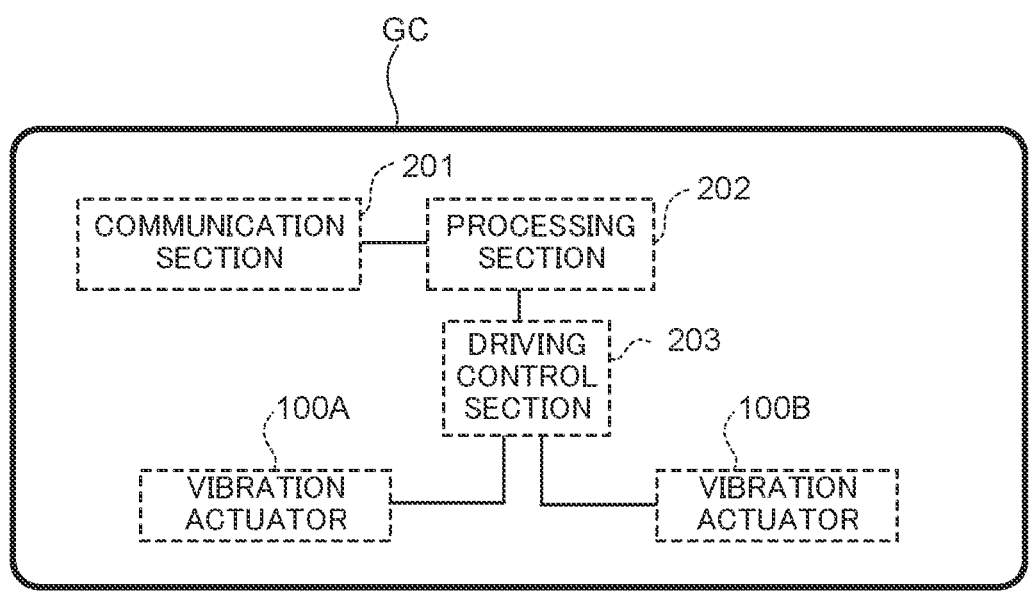
FIG. 14 illustrates a game apparatus which is an example of an electronic apparatus on which the vibration actuator is mounted.
Figure 15:
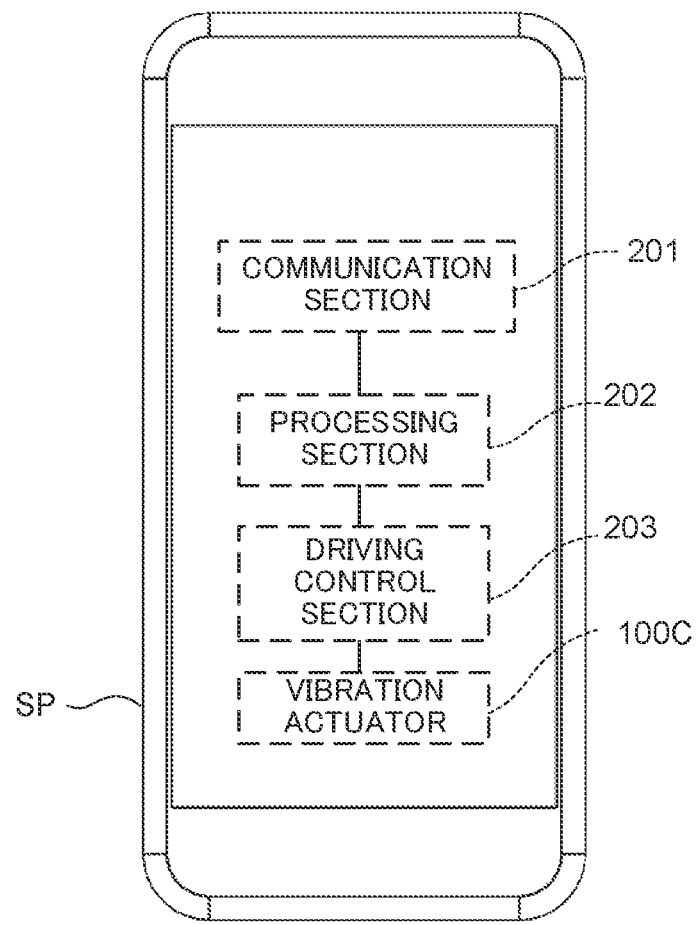
FIG. 15 illustrates a portable information terminal which is an example of the electronic apparatus on which the vibration actuator is mounted.
Figure 16:
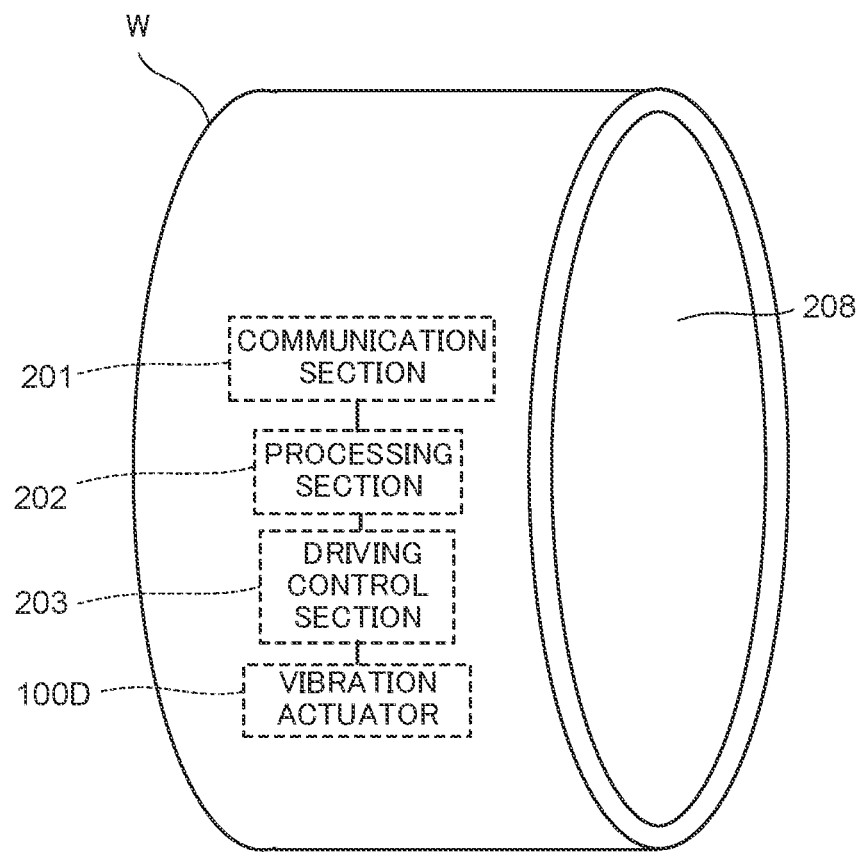
FIG. 16 illustrates a wearable terminal which is an example of the electronic apparatus on which the vibration actuator is mounted.

Movable body 10 reciprocates in the Z direction, that is, in a direction in which movable body 10 comes into contact with or is separated from side surface part 242 or 243 of case 24, by energization of coil 12 via flexible substrate 15 from a power supply section (for example, driving control section 203 illustrated in FIGS. 14 to 16). Specifically, the other end part of movable body 10 oscillates. In this way, a vibrational output of vibration actuator 1 is transmitted to a user of an electronic apparatus including vibration actuator 1.

The magnetic circuit illustrated in FIG. 6 is formed in vibration actuator 1.

In vibration actuator 1, the reference state of vibration actuator 1 is when coil 12 is not energized. In this state, the both end parts (one end part 142 and another end part 144) of core 14 around which coil 12 is wound via coil bobbin 18 are attracted to first magnet 30 and second magnet 40, respectively.

A center of a length (length in the vibration direction) orthogonal to respective axial directions of the both end parts (one end part 142 and another end part 144) of core 14 is located at a position facing the switching positions of the magnetic poles of the one or more magnets. Note that, the center of the length (length in the vibration direction) orthogonal to the respective axial directions of the both end parts (one end part 142 and another end part 144) is located on the same axis as the axis of coil 12.

Specifically, one end part 142 of core 14 is attracted by magnetic attraction forces of both of magnetic poles 301 and 302, which are different from each other, of first magnet 30, and is held at the switching position of magnetic poles 301 and 302.

Further, another end part (free end part) 144 of core 14 is attracted by magnetic attraction forces of both of magnetic poles 401 and 402, which are different from each other, of second magnet 40, and is held at the switching position of magnetic poles 401 and 402.

Thus, movable body 10 is held in the reference state only by the magnetic springs formed by first magnet 30 and second magnet 40 of fixed body 20.

In vibration actuator 1, coil 12 is disposed so as to be along and away from magnetic fluxes from first magnet 30 and second magnet 40.

With this configuration, when energization is performed as illustrated in FIGS. 6 and 7B, the both end parts (one end part 142 and another end part 144) of core 14 are magnetized so as to be magnetic poles different from each other by a current flowing through coil 12. Specifically, one end part 142 is magnetized to the N pole, and another end part 144 is magnetized to the S pole.

Thus, one end part 142 is attracted to magnetic pole 301 of first magnet 30 and repels magnetic pole 302 of first magnet 30 to generate thrust f, and moves in a direction of thrust f. On the other hand, another end part 144 repels magnetic pole 401 of second magnet 40, is attracted to magnetic pole 402 of second magnet 40, and moves in a direction of thrust −F.

As illustrated in FIG. 7B, in vibration actuator 1, the both end parts (one end part 142 and another end part 144) positioned with shaft part 50 therebetween move in the directions of thrust f and thrust −F, respectively, by energizing coil 12, thereby generating thrust −M that is the same rotational direction. Thus, movable body 10 rotates around shaft part 50 in a direction of thrust −M, and another end part 144 of movable body 10 moves onto the side of side surface part 243, comes into contact (specifically, collides) with side surface part 243, that is, the housing via cushion material 62, and imparts vibration to the housing.

Further, when the energization direction of coil 12 is switched to the opposite direction and energization is performed as illustrated in FIG. 7C, thrust −f and thrust F whose directions are opposite to each other are generated. Specifically, one end part 142 is magnetized to the S pole, and another end part 144 is magnetized to the N pole. Thus, one end part 142 repels magnetic pole 301 of first magnet 30 and is attracted to magnetic pole 302 of first magnet 30 to generate thrust −f, and moves in a direction of thrust −f. On the other hand, another end part 144 is attracted to magnetic pole 401 of second magnet 40, repels magnetic pole 402 of second magnet 40, and moves in a direction of F.

As illustrated in FIG. 7C, in vibration actuator 1, the both end parts (one end part 142 and another end part 144) positioned with shaft part 50 therebetween move in the directions of thrust −f and thrust F, respectively, by energizing coil 12, thereby generating thrust M that is the same rotational direction. Thus, movable body 10 rotates around shaft part 50 in a direction of thrust M, and another end part 144 of movable body 10 moves onto the side of side surface part 242 opposite to side surface part 243, comes into contact (specifically, collides) with side surface part 242, that is, the housing via cushion material 61, and imparts vibration to the housing.

In vibration actuator 1, movable body 10 is supported to be capable of reciprocatingly and rotationally vibrating around shaft part 50 with respect to fixed body 20 only by means of the magnetic springs using the one or more magnets (first magnet 30 and second magnet 40), coil 12, and core 14, without using an elastic member such as a plate spring.

Accordingly, unlike a vibration actuator configured to support a movable body to be capable of vibrating by a metal spring as in the related art, it is possible to prevent damage due to metal fatigue or impact, which represents a problem specific to metal springs.

Further, shaft part 50 rotatably supports movable body 10 at a position shifted from a center position of movable body 10. Thus, unlike a vibration actuator in the related art which is configured to generate vibration by rotationally driving a movable body having a cylindrical shape around a rotary shaft, it is not necessary to design such that a position of center of gravity is shifted separately, such as adding a weight, and it is possible to achieve a reduction in components and costs for that purpose.

Since no separate component for shifting a position of center of gravity is required, it is possible to realize a vibration actuator which has a high degree of freedom of layout in design without increasing the design size, is small, and gives sufficient physically-felt vibration to a user.

In vibration actuator 1 of the present embodiment, the housing composed of base plate 22 and case 24 has a rectangular parallelepiped shape, and movable body 10 reciprocatingly and rotationally vibrates in a short-side direction (the Z direction). Thus, even in a case where the vibration actuator is applied to a switch having a rectangular shape, it is possible to cause vibration without unevenness throughout the switch.

Further, in the present embodiment, the one or more magnets are disposed as first magnet 30 and second magnet 40 on both sides of core 14, and magnetic poles 301 and 302 that are two magnetic poles, and magnetic poles 401 and 402 that are two magnetic poles are disposed, respectively, such that torque to be generated in each of end parts 142 and 144 is generated in the same rotational direction. In the both end parts (one end part 142 and another end part 144) of core 14, magnetic attraction forces are generated between core 14 and first magnet 30 and second magnet 40. Thus, when movable body 10 is moved by cooperation between first magnet 30 and second magnet 40 and coil 12, a load applied to shaft part 50 due to magnetic attraction forces is offset. Accordingly, it is possible to reduce a load applied to shaft part 50 and bushing 16, and to improve reliability as a vibration actuator.

Further, in the housing, movable body 10 comes in contact with side surface parts 242 and 243 of the housing. Thus, vibration can be directly transmitted to vibration actuator 1 itself, and a large vibration can be generated. In addition, since movable body 10 comes in contact with fixed body 20 (housing) when movable body 10 vibrates, the amount of vibration also becomes constant, and a stable vibrational output can be realized as vibration actuator 1.

Note that, another end part 144 of core 14, which is the free end part of movable body 10, is formed such that the thickness in the Z direction becomes thinner toward the side of the free end. Thus, portions with which another end part 144 comes in contact via cushion materials 61 and 62 have a wider movement range during oscillation in comparison with a case where the thicknesses in the Z direction are the same thickness toward the side of the free end, and vibration actuator 1 is capable of ensuring a larger vibrational output.

Further, according to vibration actuator 1, buffer part 60 is provided in at least one of movable body 10 and inner wall surfaces (side surface parts 242 and 243) of case 24 (in side surface parts 242 and 243 in the present embodiment). Movable body 10 and the inner wall surfaces (here, side surface parts 242 and 243) of case 24 come in contact with each other via buffer part 60 (cushion materials 61 and 62). Buffer part 60 is capable of alleviating an impact when movable body 10 vibrates to come in contact with base plate 22 or case 24, and is capable of, while reducing generation of a contact sound or a vibration noise, transmitting vibration to a user. Further, since movable body 10 alternately comes in contact (specifically, collides) with base plate 22 and case 24 via buffer part 60 every time movable body 10 vibrates, the vibrational output is amplified. Thus, a user can physically feel a vibrational output greater than an actual vibrational output by movable body 10. Further, since base plate 22 is a member to be attached to a user, the vibration of movable body 10 is directly transmitted to the user via base plate 22 so that the user can physically feel a much greater vibrational output.

Here, vibration actuator 1 is driven by an AC wave that is input from the power supply section (for example, driving control section 203 illustrated in FIGS. 14 to 16) to coil 12 via flexible substrate 15. That is, the energization direction of coil 12 is switched periodically, and thrust M on the plus side in the Z direction and thrust −M on the minus side in the Z direction alternately act on movable body 10. Thus, the side of the other end of movable body 10 vibrates in a circular arc shape within the YZ plane.

Hereinafter, a brief description will be given of the driving principle of vibration actuator 1. In vibration actuator 1 of the present embodiment, movable body 10 vibrates with respect to fixed body 20 at resonance frequency $f_r$ [Hz] calculated by following equation 1 where J [kg·m²] represents the moment of inertia of movable body 10 and $K_{sp}$ represents the spring constant of the magnetic spring in the torsional direction.

$$f_r = \frac{1}{2\pi}\sqrt{\frac{K_{sp}}{J}} \quad \text{(Equation 1)}$$

$f_r$: Resonance frequency [Hz]
J: Moment of inertia [kg·m²]
$K_{sp}$: Spring constant [N·m/rad]

Since movable body 10 is a mass part in a vibration model of a spring-mass system, movable body 10 is brought into a resonance state when an AC wave of a frequency equal to resonance frequency $f_r$ of movable body 10 is input to coil 12. That is, movable body 10 can be efficiently vibrated by inputting an AC wave of a frequency, which is substantially equal to resonance frequency $f_r$ of movable body 10, from the power supply section (for example, driving control section 203 illustrated in FIGS. 14 to 16) to coil 12.

The equation of movement and the circuit equation representing the driving principle of vibration actuator 1 are indicated below. Vibration actuator 1 is driven based on the equation of movement represented by following equation 2 and on the circuit equation represented by following equation 3.

$$J\frac{d^2\theta(t)}{dt^2} = K_t i(t) - K_{sp}\theta(t) - D\frac{d\theta(t)}{dt} \quad \text{(Equation 2)}$$

J: Moment of inertia [kg·m²]
θ(t): Angle [rad]
$K_t$: Torque constant [N·m/A]
i(t): Current [A]
$K_{sp}$: Spring constant [N·m/rad]
D: Damping coefficient [N·m/(rad/s)]

$$e(t) = Ri(t) + L\frac{di(t)}{dt} + K_e\frac{d\theta(t)}{dt} \quad \text{(Equation 3)}$$

e(t): Voltage [V]
R: Resistance [Ω]
L: Inductance [H]
$K_e$: Counter electromotive force constant [V/(rad/s)]

That is, moment of inertia J [kg·m²], angle of rotation θ(t) [rad], torque constant $K_t$ [N·m/A], current i(t) [A], spring constant $K_{sp}$ [N·m/rad], damping coefficient D [N·m/(rad/s)], and the like of movable body 10 in vibration actuator 1 can be changed appropriately as long as equation 2 is satisfied. Further, voltage e(t) [V], resistance R [Ω], inductance L [H], and counter electromotive force constant $K_e$ [V/(rad/s)] can be changed appropriately as long as equation 3 is satisfied.

As described above, in vibration actuator 1, a great vibrational output can be efficiently obtained in a case where coil 12 is energized using an AC wave corresponding to resonance frequency $f_r$ determined by moment of inertia J of movable body 10 and spring constant $K_{sp}$ of the magnetic spring.

<Variation 1>

Figure 8:
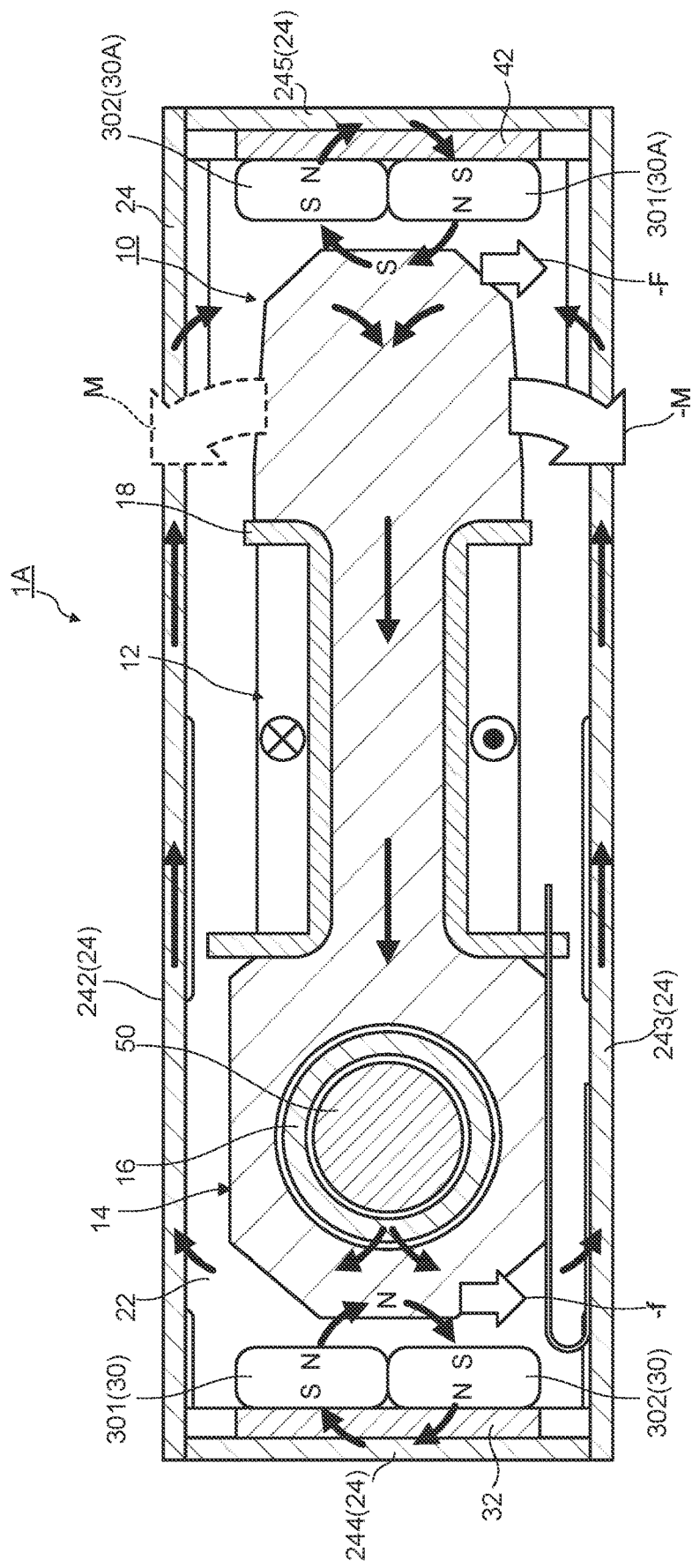
FIG. 8 is a sectional view of a configuration of principal parts of a vibration actuator according to Variation 1 of Embodiment 1.

FIG. 8 is a plane sectional view of a configuration of a magnetic circuit of vibration actuator 1A as a variation of vibration actuator 1 of Embodiment 1. Note that, for convenience, FIG. 8 illustrates a state of movable body 10 when coil 12 is energized clockwise when viewing vibration actuator 1A from a side of a tip part of movable body 10, that is, a side of another end part 144 of core 14.

In comparison with vibration actuator 1, vibration actuator 1A illustrated in FIG. 8 includes, instead of second magnet 40, first magnet 30A that is configured in the same manner as first magnet 30.

That is, in vibration actuator 1A, the one or more magnets disposed to face each other in the axial direction of coil 12 in each of the both end parts (one end part 142 and another end part 144) of core 14 in the configuration of vibration actuator 1 are first magnets 30 and 30A.

In vibration actuator 1A, the one or more magnets are disposed as first magnets 30 and 30A on both sides of core 14, and torque to be generated in each of end parts 142 and 144 is not generated in the same rotational direction. However, in core 14, shaft part 50 is inserted through bushing 16, which is a non-magnetic body, on a side of one end part 142 so that the magnetic poles at one end part 142 are not significantly excited since a magnetic flux generated by energizing coil 12 does not pass through shaft part 50. A side of one end part 142 functions as a magnetic spring without greatly contributing to torque generation by one end part 142 and first magnet 30.

Accordingly, torque generated by one end part 142 and first magnet 30 when causing movable body 10 to reciprocatingly and rotationally vibrate by energizing coil 12 does not inhibit torque generated by another end part 144 and first magnet 30A.

Thus, in the same manner as vibration actuator 1, unlike a vibration actuator configured to support a movable body to be capable of vibrating by a metal spring as in the related art, vibration actuator 1A makes it possible to prevent damage due to metal fatigue or impact, which represents a problem specific to metal springs.

Further, unlike a vibration actuator in the related art which is configured to generate vibration by rotationally driving a movable body having a cylindrical shape, it is not necessary to design such that a position of center of gravity is shifted separately, such as adding a weight, and it is possible to achieve a reduction in components and costs for that purpose. Since no separate component for shifting a position of center of gravity is required, it is possible to realize a vibration actuator having a high degree of freedom of layout.

In addition, vibration actuator 1A uses first magnets 30 and 30A. Thus, since two first magnet units in which back yoke 32 is attached to first magnet 30 are used, it is not necessary to separately use a second magnet unit in which back yoke 42 is attached to second magnet 40. Accordingly, it is not necessary to manufacture a second magnet unit, and it is possible to reduce the manufacturing cost. Further, in the assembly, there is no mistake in the attachment positions of the second magnet unit and the first magnet unit.

Embodiment 2

Figure 9:
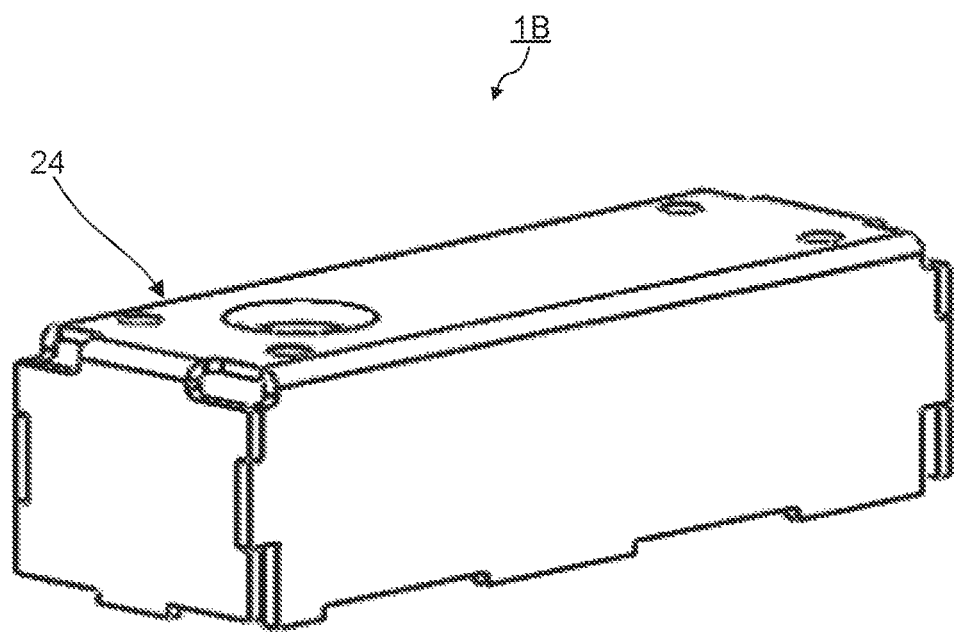
FIG. 9 is a perspective view of a vibration actuator according to Embodiment 2 of the present invention in a state in which a cover of the vibration actuator is removed.
Figure 9:
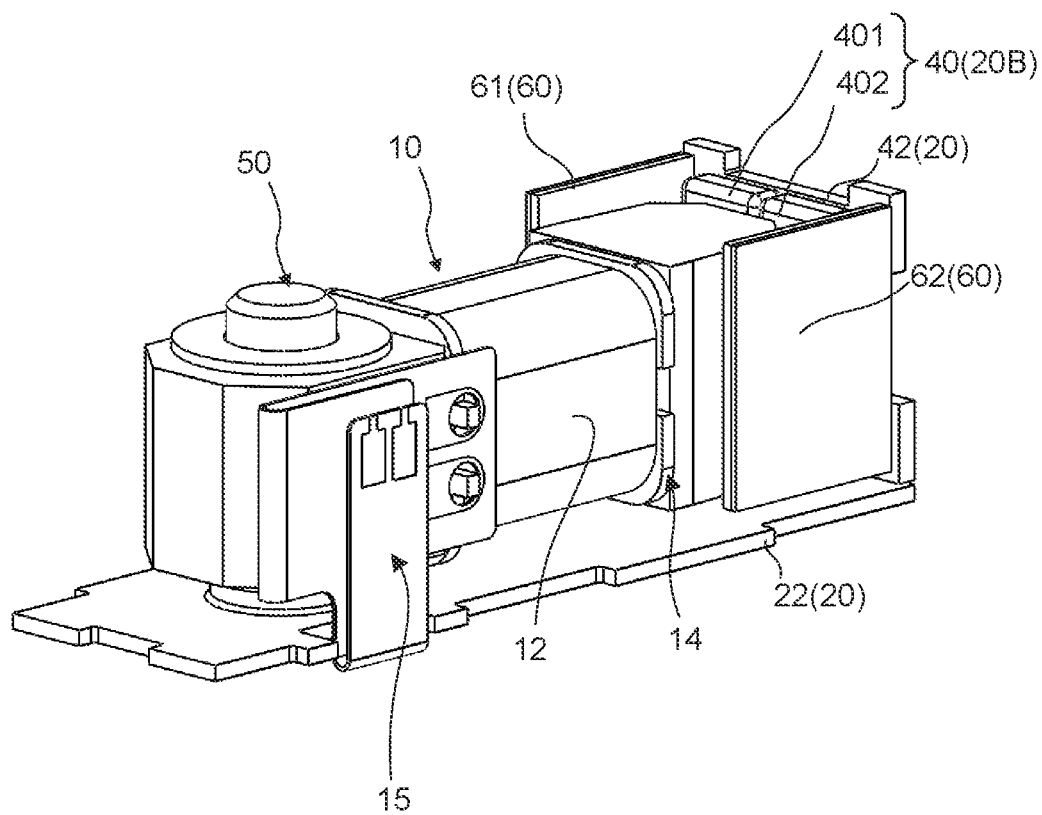
Figure 10:
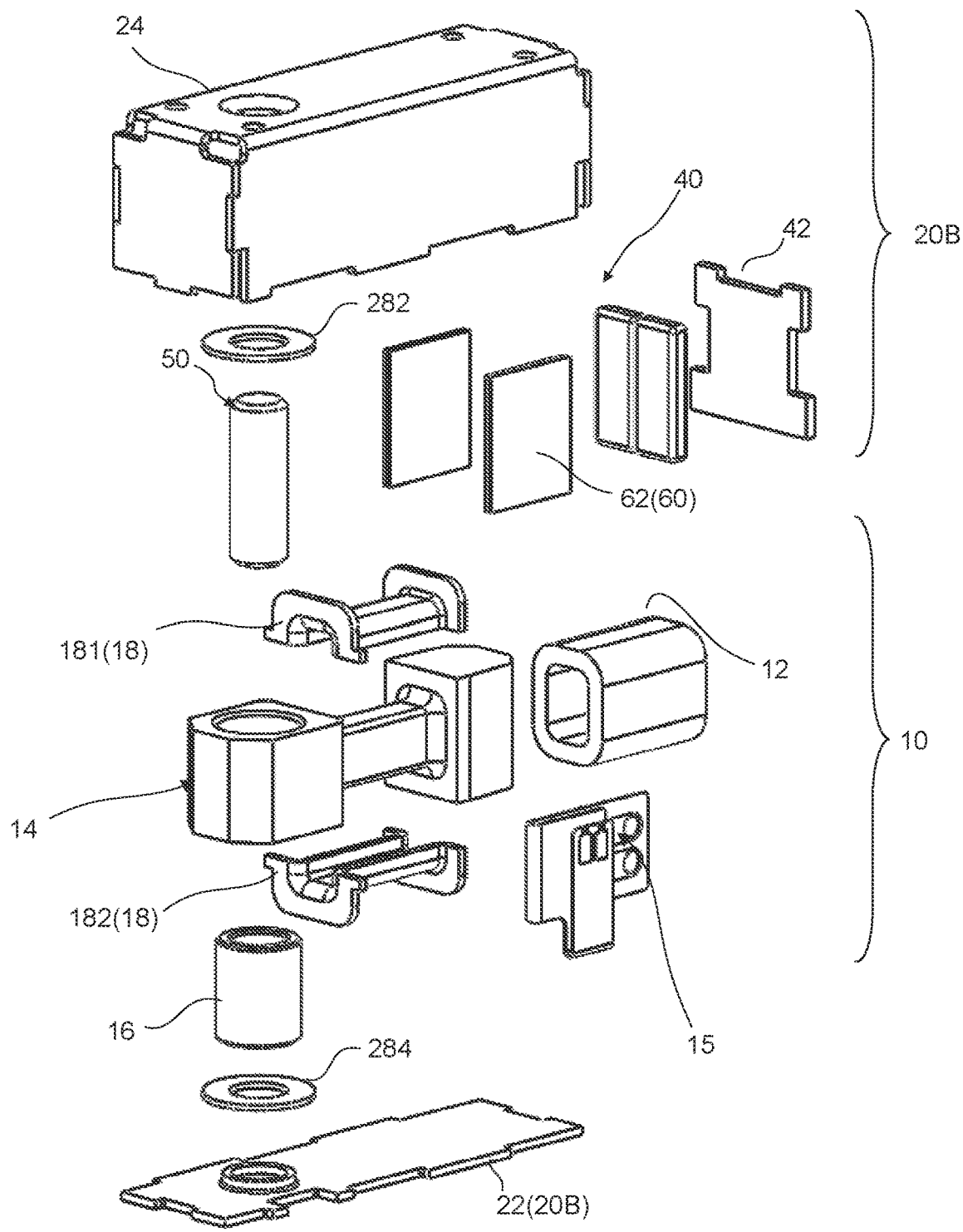
FIG. 10 is an exploded perspective view of the vibration actuator.
Figure 11:
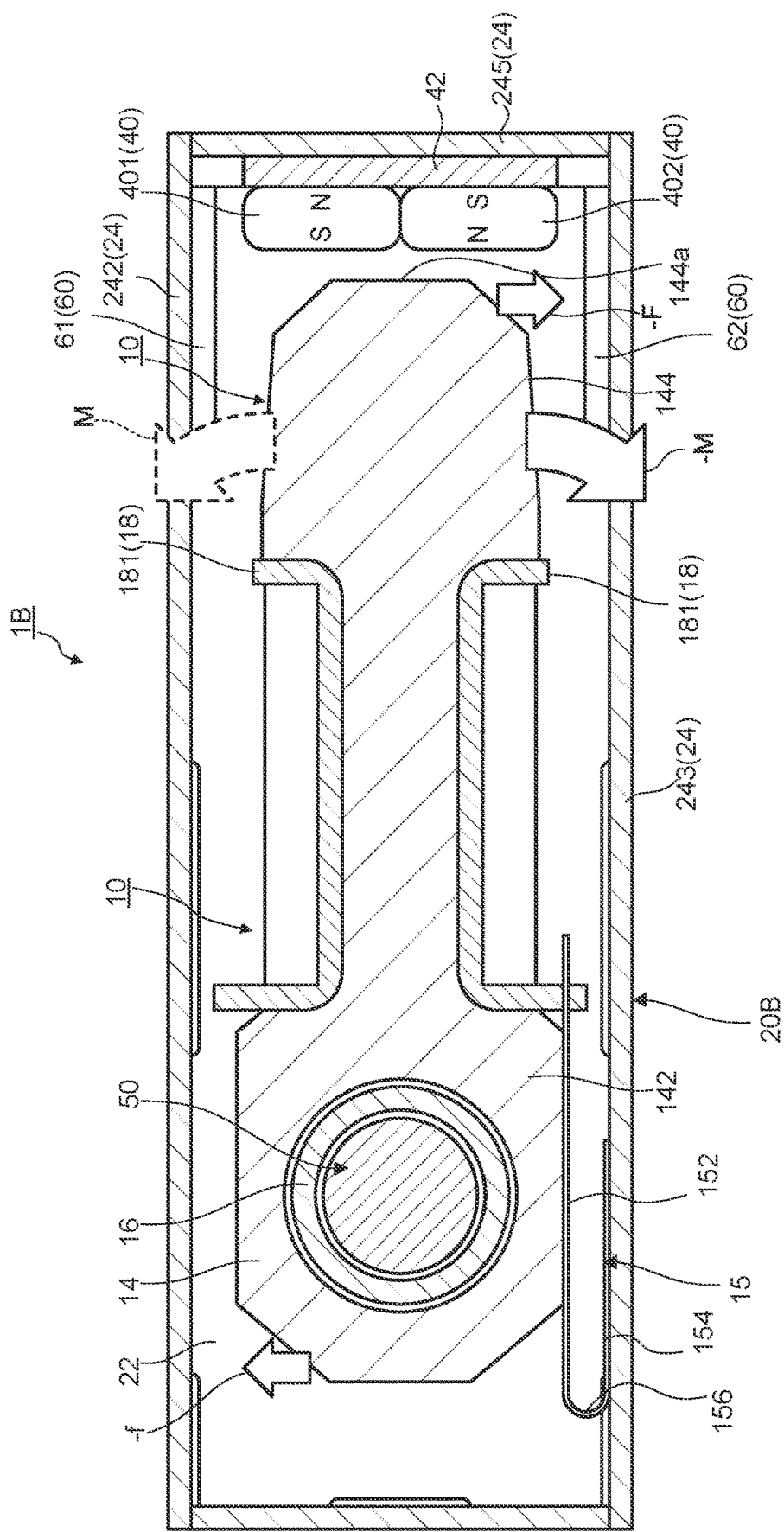
FIG. 11 is a plane sectional view of a configuration of principal parts of the vibration actuator.
Figure 12:
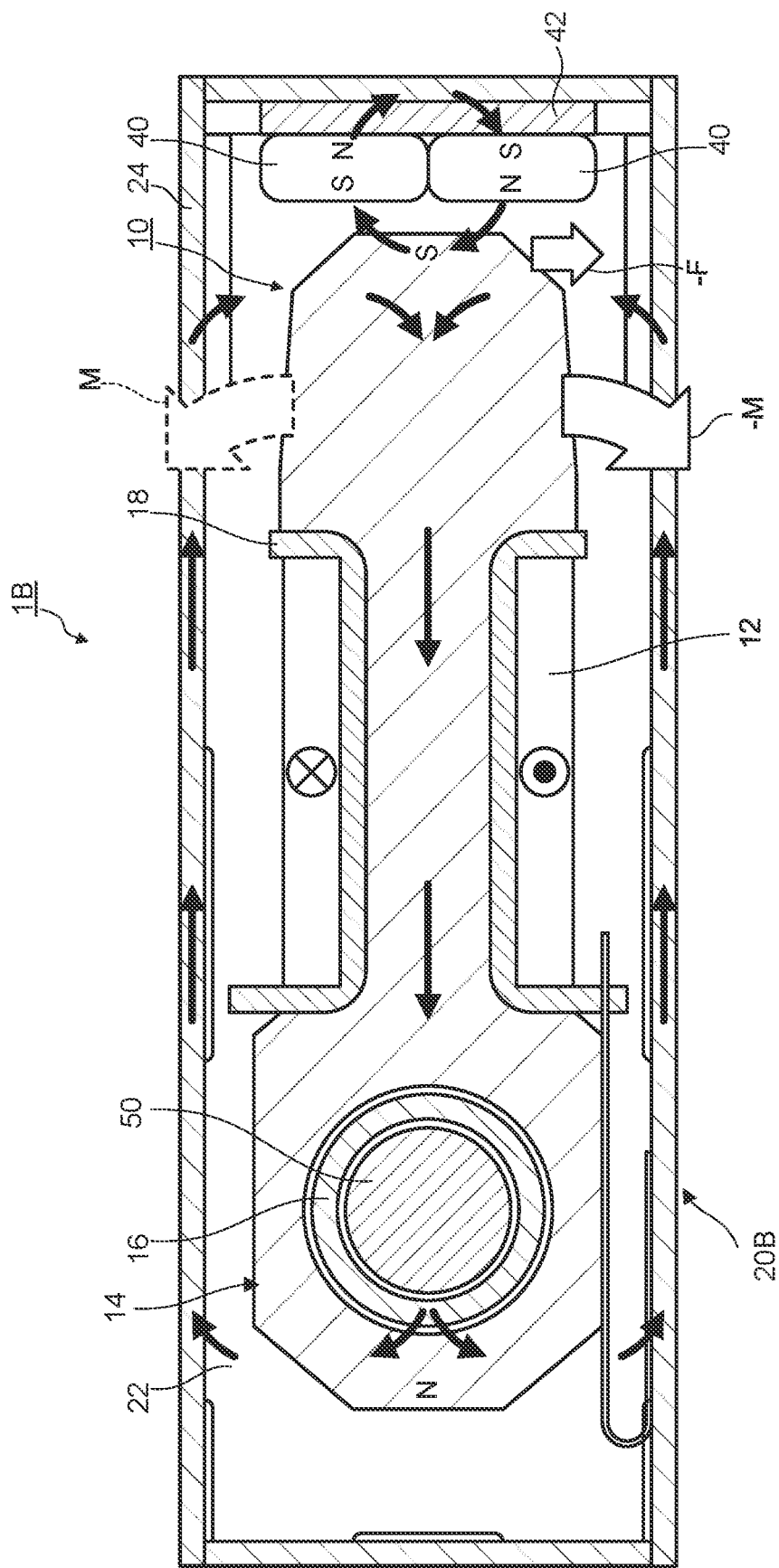
FIG. 12 illustrates a magnetic circuit of the vibration actuator.
Figure 13A:
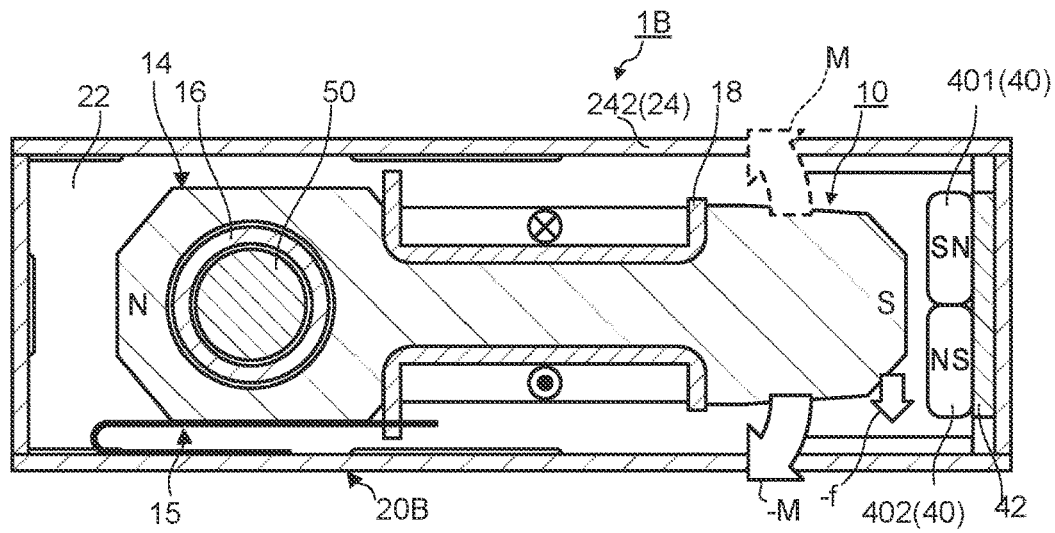
FIG. 13A is a longitudinal sectional view of a movable body when energization is not performed.
Figure 13B:
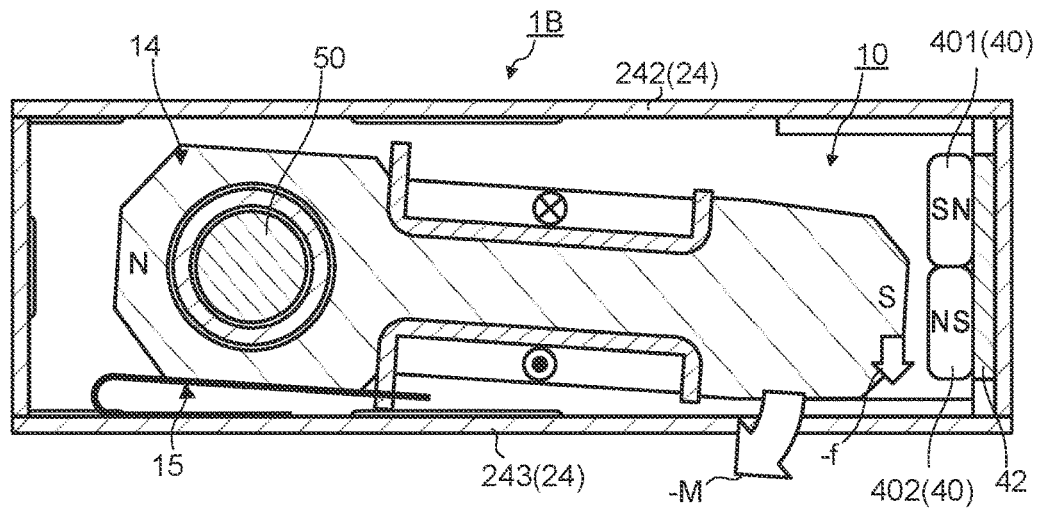
FIG. 13B is a longitudinal sectional view of the movable body when a coil is energized clockwise when viewing the vibration actuator from a side of a tip part of the movable body.
Figure 13C:
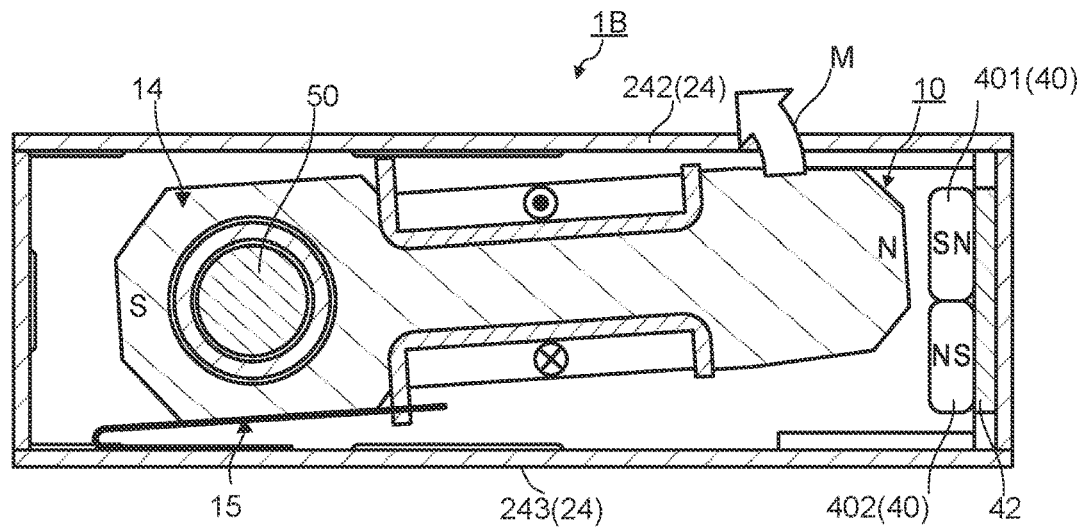
FIG. 13C is a longitudinal sectional view of the movable body when the coil is energized counterclockwise when viewing the vibration actuator from the side of the tip part of the movable body.

FIG. 9 is a perspective view of vibration actuator 1B according to Embodiment 2 of the present invention in a state in which a cover of vibration actuator 1B is removed, FIG. 10 is an exploded view of vibration actuator 1B, and FIG. 11 is a plane sectional view of a configuration of principal parts of vibration actuator 1B. Further, FIG. 12 illustrates a magnetic circuit of vibration actuator 1B, and FIGS. 13A to 13C are longitudinal sectional views illustrating operation of a movable body. FIG. 13A illustrates a state of movable body 10 when energization is not performed (reference state). FIG. 13B illustrates a state of movable body 10 when coil 12 is energized clockwise when viewing vibration actuator 1B from a side of a tip part of movable body 10, that is, a side of another end part 144 of core 14. Further, FIG. 13C illustrates a state of movable body 10 when coil 12 is energized counterclockwise when viewing vibration actuator 1B from the side of the tip part of movable body 10, that is, the side of another end part 144 of core 14.

In comparison with vibration actuator 1, first magnet 30 and back yoke 32 are omitted from vibration actuator 1B according to the embodiment illustrated in FIGS. 9 to 13A, 13B and 13C.

Accordingly, hereinafter, a description will be given of a structural part different from that of vibration actuator 1, and a component attaining the same operation and effect as the corresponding component in vibration actuator 1 is denoted by the same name and the same reference numeral, and a description thereof will be omitted.

In the same manner as vibration actuator 1, vibration actuator 1B is mounted as a vibration generation source on an electronic apparatus such as a smartphone (see FIGS. 14 to 16), and realizes a vibration function of the electronic apparatus.

Vibration actuator 1B illustrated in FIGS. 9 to 13A, 13B, and 13C includes movable body 10, shaft part 50, and fixed body 20B. Movable body 10 is supported by fixed body 20B via shaft part 50. In the present embodiment, movable body 10 is rotatably supported by fixed body 20B such that a side of another end of movable body 10 reciprocates while shaft part 50 inserted through movable body 10 on a side of one end thereof serves as a fulcrum.

Movable body 10 is a part that vibrates (oscillates) during driving. In the present embodiment, movable body 10 includes coil 12, and core 14 around which coil 12 is wound. Fixed body 20B includes, as a magnet, second magnet 40 disposed to face another end part 144 of core 14.

Movable body 10 is movably supported with respect to fixed body 20B by a magnetic spring by means of a magnetic attraction force of second magnet 40.

In the present embodiment, movable body 10 is movably supported around shaft part 50 with respect to fixed body 20B by a magnetic spring formed by second magnet 40, coil 12, and core 14.

Movable body 10 includes coil 12, core 14 around which coil 12 is wound, bushing (bearing) 16 that is a bearing, and a coil bobbin composed of divided bobbin bodies 181 and 182. Further, fixed body 20B includes, in addition to second magnet 40, base plate 22 and case 24. In the same manner as fixed body 20, fixed body 20B includes a cushion material (buffer part 60).

Second magnet 40 moves movable body 10 by cooperation with coil 12. Second magnet 40 functions as a magnetic spring by a magnetic attraction force with respect to movable body 10. In the present embodiment, second magnet 40 and core 14 around which coil 12 is wound form the magnetic spring to movably support movable body 10.

Second magnet 40 is away from and facing another end part of core 14 in an axial direction of coil 12. Second magnet 40 is magnetized toward another end part 144 of core 14. In the same manner as in Embodiment 1, second magnet 40 includes, as a surface on a side facing core 14, two magnetic poles 401 and 402 that are different from each other and arranged in a direction (corresponding to the vibration direction of movable body 10) orthogonal to an extending direction of shaft part 50.

Magnetic poles 401 and 402 are disposed such that a center of core 14 of movable body 10 (here, the center is on an axis of coil 12 and corresponds to a center of the magnetic poles when coil 12 is excited) is positioned facing a boundary between magnetic poles 401 and 402, that is, a switching position of magnetic poles 401 and 402.

For example, as illustrated in FIGS. 10 and 11, in second magnet 40, magnetic pole 401 disposed on a side of side surface part 242 and facing movable body 10 is magnetized with the S pole, and magnetic pole 402 disposed on a side of side surface part 243 and facing movable body 10 is magnetized with the N pole.

Second magnet 40 includes a rear surface on which back yoke 42 is bonded so that an improvement in an magnetic attraction force of second magnet 40 is achieved.

As illustrated in FIGS. 13A to 13C, a magnetic flux emitted from the N pole and incident on the S pole is formed at second magnet 40 when coil 12 is not energized. When energization is not performed, another end part 144 of core 14 is attracted to both the S and N poles of second magnet 40, and is held at a switching position of magnetic poles 401 and 402 that are different from each other (the S and N poles). That is, second magnet 40 functions, together with core 14 that is a magnetic body of movable body 10, as a magnetic spring by means of a magnetic attraction force generated between second magnet 40 and core 14 to movably support movable body 10. Note that, another end part 154 of flexible substrate 15 connected to coil 12 in one end part 152 is fixed to side surface part 243.

In vibration actuator 1B, when coil 12 is not energized, that is, in the reference state, another end part 144 of core 14 around which coil 12 is wound is attracted by magnetic attraction forces of both of magnetic poles 401 and 402, which are different from each other, of second magnet 40. Thus, another end part 144 is held at the switching position of magnetic poles 401 and 402.

Another end part (free end part) 144 of core 14 in movable body 10 is held in the reference state only by the magnetic spring formed by using second magnet 40 of fixed body 20B. Note that, a center of a length (length in the vibration direction) orthogonal to an axial direction of another end part 144 is located on the same axis as the axis of coil 12.

In vibration actuator 1B, when energization is performed as illustrated in FIGS. 12 and 13B, another end part 144 of core 14 is magnetized to the S pole by a current flowing through coil 12.

Another end part 144 repels magnetic pole 401 of second magnet 40, is attracted to magnetic pole 402 of second magnet 40, and moves in a direction of −F.

As illustrated in FIG. 13B, another end part 144 of vibration actuator 1B moves in the direction of −F by energizing coil 12, thereby generating thrust −M that is the same rotational direction. Thus, movable body 10 rotates in a direction of thrust −M, and another end part 144 of movable body 10 moves onto the side of side surface part 243, comes into contact (specifically, collides) with side surface part 243, that is, the housing via cushion material 62, and imparts vibration to the housing.

Further, when the energization direction of coil 12 is switched to the opposite direction and energization is performed as illustrated in FIG. 13C, thrust F whose direction is opposite to movable body 10 is generated. Specifically, another end part 144 is magnetized to the N pole, is attracted to magnetic pole 401 of second magnet 40, repels magnetic pole 402 of second magnet 40, and moves in a direction of F.

As illustrated in FIG. 13C, another end part 144 of vibration actuator 1B moves in the direction of F by energizing coil 12, and thereby another end part 144 moves onto a side of side surface part 242 opposite to side surface part 243, comes into contact (specifically, collides) with side surface part 242, that is, the housing via cushion material 61, and imparts vibration to the housing.

In vibration actuator 1B, in the same manner as vibration actuator 1, movable body 10 is supported to be capable of reciprocatingly and rotationally vibrating around shaft part 50 with respect to fixed body 20B only by means of the magnetic spring using second magnet 40, coil 12, and core 14, without using an elastic member such as a plate spring. Accordingly, unlike a vibration actuator configured to support a movable body to be capable of vibrating by a metal spring as in the related art, it is possible to prevent damage due to metal fatigue or impact, which represents a problem specific to metal springs. Further, since shaft part 50 rotatably supports movable body 10 at a position shifted from a center position of movable body 10, it is possible to obtain the same operation and effect as in Embodiment 1.

<Electronic Apparatus on which Vibration Actuator is Mounted>

FIGS. 14 to 16 each illustrate an example of an electronic apparatus on which the vibration actuator is mounted. FIG. 14 illustrates an example in which the vibration actuator is mounted on game controller GC, FIG. 15 illustrates an example in which the vibration actuator is mounted on smartphone SP as a portable terminal, and FIG. 16 illustrates an example in which the vibration actuator is mounted on wearable terminal W.

Game controller GC is, for example, connected to a game machine main body by radio communication, and is used by being gripped or held by a user. Here, game controller GC has a rectangular plate shape, and the user operates game controller GC while grasping right and left sides thereof with both hands.

Game controller GC notifies a user of a command from the game machine main body by vibration. Game controller GC has, although not illustrated, functions other than the command notification, for example, an input operation section with respect to the game machine main body.

Smartphone SP is, for example, a portable communication terminal such as a mobile phone and a smartphone. Smartphone SP notifies a user of an incoming call from an external communication device by vibration, and also realizes each function of smartphone SP (for example, a function that gives a feeling of operation or realism).

Wearable terminal W is worn for use by a user. Here, wearable terminal W has a ring shape, and is attached to a finger of the user. Wearable terminal W is connected to an information communication terminal (for example, a mobile phone) by radio communication. Wearable terminal W notifies the user of an incoming call or an incoming mail of the information communication terminal by vibration. Note that, wearable terminal W may have a function (for example, input operation to the information communication terminal) other than the incoming call notification.

As illustrated in FIGS. 14 to 16, each electronic apparatus such as game controller GC, smartphone SP, and wearable terminal W includes communication section 201, processing section 202, driving control section 203, and vibration actuator 100A, 100B, 100C or 100D, which is any of vibration actuators 1, 1A and 1B, as a driving section. Note that, a plurality of vibration actuators 100A and 100B are mounted on game controller GC.

In game controller GC, smartphone SP, and wearable terminal W, vibration actuators 100A, 100B, 100C and 100D are mounted, for example, such that the main face of the terminal is parallel to surfaces (here, side surface parts 242 and 243 of case 24) orthogonal to a vibration direction of vibration actuator 100A, 100B, 100C or 100D. The main surface of the electronic apparatus is a surface that comes in contact with a body surface of a user, and means, in the present embodiment, a vibration transmitting surface that comes in contact with a body surface of a user to transmit vibration.

Specifically, in game controller GC, vibration actuators 10A and 10B are mounted such that a surface with which a fingertip, a ball of a finger, a palm of a hand or the like of a user operating game controller GC comes into contact, or a surface provided with an operation section is orthogonal to the vibration direction. Further, in the case of smartphone SP, vibration actuator 100C is mounted such that a display screen (touch screen surface) is orthogonal to the vibration direction. In the case of wearable terminal W, vibration actuator 1 is mounted such that inner peripheral surface 208 of a housing having a ring shape is the main surface (vibration transmitting surface) and inner peripheral surface 208 and the XY plane are in substantially parallel (including parallel) with each other. Thus, vibration in a direction perpendicular to the main surface of game controller GC, smartphone SP or wearable terminal W is transmitted to the user.

Communication section 201 is connected to an external communication device by radio communication, receives a signal from the communication device, and outputs the signal to processing section 202. In the case of game controller GC, the external communication device is a game machine main body as an information communication terminal, and communication is performed in accordance with a short-range radio communication standard such as Bluetooth (registered trademark). In the case of smartphone SP, the external communication device is, for example, a base station, and communication is performed in accordance with mobile communications standards. Further, in the case of wearable terminal W, the external communication device is, for example, an information communication terminal such as a mobile phone, smartphone and a portable game terminal, and communication is performed in accordance with a short-distance radio communication standard such as Bluetooth (registered trademark).

Processing section 202 converts an input signal into a driving signal for driving vibration actuator 100A, 100B, 100C or 100D by a conversion circuit section (illustration is omitted), and outputs the driving signal to driving control section 203. Note that, in smartphone SP, processing section 202 generates a driving signal based not only on a signal input from communication section 201 but also on a signal input from various function sections (illustration is omitted; for example, an operation section such as a touch screen).

Driving control section 203 is connected to vibration actuator 100A, 100B, 100C or 100D, and a circuit for driving vibration actuator 100A, 100B, 100C or 100D is mounted thereon. Driving control section 203 provides vibration actuator 100A, 100B, 100C or 100D with a driving signal.

Vibration actuator 100A, 100B, 100C or 100D is driven in accordance with a driving signal from driving control section 203. Specifically, in vibration actuator 100A, 100B, 100C or 100D, movable body 10 vibrates in a direction orthogonal to the main surface of game controller GC, smartphone SP, or wearable terminal W.

Since movable body 10 comes into contact with side surface part 242 or 243 of case 24 via cushion material 61 or 62 every time movable body 10 vibrates, an impact on surface part 242 or 243 of case 24 (that is, an impact on the housing) accompanied by the vibration of movable body 10 is transmitted directly to a user as vibration. In particular, in the case of game controller GC, the plurality of vibration actuators 10A and 10B are mounted thereon so that one of the plurality of vibration actuators 10A and 10B can be driven or both thereof can be driven at the same time, depending on an input driving signal.

Since vibration perpendicular to a body surface of a user which comes in contact with game controller GC, smartphone SP or wearable terminal W is transmitted to the body surface of the user, sufficient physically-felt vibration can be given to the user. In game controller GC, body-felt vibration can be given to the user with one or both of vibration actuators 10A and 10B, and vibration with a high expression capability can be given, such as at least selectively giving strong vibration or weak vibration.

Hereinabove, the invention made by the present inventors has been specifically described based on the embodiments. However, the present invention is not limited to the above-described embodiments and modifications can be made without departing from the gist thereof.

Further, for example, it is also preferable that the vibration actuator according to the present invention be applied to a portable apparatus (for example, a portable information terminal, such as a tablet PC, and a portable game terminal) other than game controller GC, smartphone SP, and wearable terminal W indicated in the embodiments. Further, vibration actuators 1, 1A and 1B in the present embodiments can also be used for, in addition to the portable apparatus described above, an electric cosmetic tool such as a facial massage machine that requires vibration.

It should be understood that the embodiments disclosed herein are illustrative in every respect and not limitative. The scope of the present invention is specified not by the foregoing description but by the claims, and is intended to include all modifications in so far as they are within the scope of the appended claims or the equivalents thereof.

The disclosure of Japanese Patent Application No. 2018-131821, filed on Jul. 11, 2018, including the specification, drawings and abstract, is incorporated herein by reference in its entirety.

INDUSTRIAL APPLICABILITY

The vibration actuator according to the present invention is small and capable of giving sufficient physically-felt vibration to a user without an increase in size, and is useful as being equipped in an electronic apparatus such as a game controller, a smartphone or a wearable terminal.

REFERENCE SIGNS LIST 1, 1A, 1B, 100A, 100B, 100C, 100D Vibration actuator
10 Moving body
12 Coil
14 Core
15 Flexible substrate
16 Bushing (Bearing)
18 Coil bobbin
20, 20B Fixed body
22 Base plate
23 Shaft fixing part
24 Case
30, 30A First magnet
32, 42 Back yoke
40 Second magnet
50 Shaft part
60 Buffer part
61, 62 Cushion material
142, 152 One end part
144, 154 Another end part
142a, 144a End surface
156 Curved part
181, 182 Divided bobbin body
201 Communication section
202 Processing section
203 Driving control section
208 Inner peripheral surface
241 Bottom surface part
242, 243 Side surface part
244 One end surface part
245 Another end surface part
282, 284 Washer
301, 302, 401, 402 Magnetic pole

What is claimed is:

1. A vibration actuator, comprising:
a movable body including a coil;
a fixed body including one or more magnets; and
a shaft part rotatably supporting the movable body, the movable body reciprocatingly and rotationally vibrating around the shaft part with respect to the fixed body by cooperation between the coil and the one or more magnets, wherein:
the one or more magnets are arranged in a direction orthogonal to an axial direction of the shaft part, each of the one or more magnets including two magnetic poles facing the movable body in a direction of a coil axis of the coil,
the shaft part supports the movable body at a position shifted from a center position of the movable body in the direction orthogonal to the axial direction of the shaft part,
the coil axis of the coil of the movable body is located at a position facing a switching position of the two magnetic poles of each of the one or more magnets,
the movable body includes a core around which the coil is wound, the core extending along the coil axis,
the core is rotatably supported by the shaft part on a side of one end of the core,
the one or more magnets include a first magnet and a second magnet disposed such that the core is placed between the first and the second magnets in an axial direction of the coil with two magnetic poles of the first magnet being disposed toward one of the both end parts of the core and two magnetic poles of the second magnet being disposed toward another one thereof, and
the switching positions of each of the first magnet and the second magnet are disposed such that they are positions facing a center of each of the magnetic poles of both end parts of the core.

2. The vibration actuator according to claim 1, wherein the two magnetic poles of the first magnet and the two magnetic poles of the second magnet are disposed such that torque to be generated by cooperation with the coil when the coil is excited is generated in a same rotational direction.

3. The vibration actuator according to claim 1, wherein:
the fixed body includes a case to which the shaft part is fixed and which rotatably houses the movable body, the case having a rectangular parallelepiped shape, wherein the case has a rectangular parallelepiped shape extending in an axial direction of the coil, and
the movable body is movably disposed via the shaft part on a side of one end of the movable body in the case, and the movable body on a side of another end part thereof reciprocatingly and rotationally vibrates in a short-side direction of the case.

4. The vibration actuator according to claim 3, wherein the movable body reciprocatingly and rotationally vibrates in the short-side direction of the case and comes in contact with an inner wall surface of the case.

5. The vibration actuator according to claim 3, wherein:
at least one of the movable body and an inner wall surface of the case is provided with a buffer part, and
the movable body and the inner wall surface of the case come in contact with each other via the buffer part.

6. The vibration actuator according to claim 5, wherein the buffer part is an elastomer.

7. The vibration actuator according to claim 5, wherein the buffer part is a silicone rubber.

8. The vibration actuator according to claim 1, wherein:
   the coil is connected to a flexible substrate fixed to the fixed body on a side of one end of the flexible substrate, the coil being connected to the flexible substrate at another end part of the flexible substrate, and
   the flexible substrate is provided with at least one curved part between the side of the one end and the other end part of the flexible substrate, the curved part having flexibility and being electrically connected to the coil from the side of the one end.

9. The vibration actuator according to claim 8, wherein the at least one 1 curved part is disposed near the shaft part.

10. The vibration actuator according to claim 1, wherein:
    the shaft part is fixed to the fixed body and is rotatably inserted through the movable body via a bearing provided in the movable body, and
    one of the shaft part and the bearing is formed by a non-magnetic material.

11. An electronic apparatus on which the vibration actuator according to claim 1 is mounted.

\* \* \* \* \*